United States Patent
Weng et al.

(10) Patent No.: US 8,526,420 B2
(45) Date of Patent: Sep. 3, 2013

(54) METHOD AND APPARATUS FOR AUTONOMOUS UPLINK TIMING ADVANCE MAINTENANCE

(75) Inventors: Jianfeng Weng, Kanata (CA); Mark Earnshaw, Kanata (CA)

(73) Assignee: Blackberry Limited, Waterloo (CA)

( * ) Notice: Subject to any disclaimer, the term of this patent is extended or adjusted under 35 U.S.C. 154(b) by 346 days.

(21) Appl. No.: 12/837,813

(22) Filed: Jul. 16, 2010

(65) Prior Publication Data

US 2012/0014371 A1   Jan. 19, 2012

(51) Int. Cl.
*H04J 3/06* (2006.01)

(52) U.S. Cl.
USPC .......................................................... 370/350

(58) Field of Classification Search
USPC ......... 370/328–339, 350, 503–510; 375/354, 375/356, 359
See application file for complete search history.

(56) References Cited

U.S. PATENT DOCUMENTS

| | | | |
|---|---|---|---|
| 7,315,536 B2 | 1/2008 | Koorapaty | |
| 2007/0149206 A1* | 6/2007 | Wang et al. | 455/450 |
| 2007/0293157 A1 | 12/2007 | Haartsen et al. | |
| 2008/0002660 A1 | 1/2008 | Jeong et al. | |
| 2008/0084849 A1 | 4/2008 | Wang et al. | |
| 2010/0029291 A1 | 2/2010 | Angelow et al. | |

FOREIGN PATENT DOCUMENTS

| | | |
|---|---|---|
| EP | 1871035 | 12/2007 |
| WO | 0124411 | 4/2001 |
| WO | 2009120462 | 10/2009 |
| WO | 2010001789 | 1/2010 |

OTHER PUBLICATIONS

European Search Report in respect of European Patent Application No. 10169874.4, dated Jan. 14, 2001.
TS 36.133, "3rd Generation Partnership Project; Technical Specification Group Radio Access Network; Evolved Universal Terrestrial Radio Access (E-UTRA); Requirements for support of radio resource management (Release 8)", Version 8.7.0, Sep. 2009.
TS 36.211, "3rd Generation Partnership Project; Technical Specification Group Radio Access Network; Evolved Universal Terrestrial Radio Access (E-UTRA); Physical channels and modulation (Release 8)", Version 8.8.0, Sep. 2009.
TS 36.212, "3rd Generation Partnership Project; Technical Specification Group Radio Access Network; Evolved Universal Terrestrial Radio Access (E-UTRA); Multiplexing and channel coding (Release 8)", Version 8.7.0, Jun. 2009.

(Continued)

*Primary Examiner* — Frank Duong

(57) ABSTRACT

According to some embodiments, a mobile device may calculate adjustments of a timing advance based on a determined relative downlink timing change. Adjustments of the timing advance may be made toward a target timing advance in accordance with an adjustment parameter. The adjustment parameter may be adapted based on a received timing advance command and at least one of: a calculated adjustment of the timing advance; and a difference between the target timing advance and the timing advance. In another aspect, self-adjustment of a timing advance performed by a mobile device may be configured based on a property of a communication channel between the mobile device and a base station. In another aspect, self-adjustment of a timing advance performed by a mobile device may be configured based on timing advance commands received from a base station.

20 Claims, 22 Drawing Sheets

(56) References Cited

OTHER PUBLICATIONS

TS 36.213, "3rd Generation Partnership Project; Technical Specification Group Radio Access Network; Evolved Universal Terrestrial Radio Access (E-UTRA); Physical layer procedures (Release 8)", Version 8.8.0, Sep. 2009.
TS 36.321, "3rd Generation Partnership Project; Technical Specification Group Radio Access Network; Evolved Universal Terrestrial Radio Access (E-UTRA); Medium Access Control (MAC) protocol specification (Release 8)", Version 8.7.0, Sep. 2009.
TS 36.331, "3rd Generation Partnership Project; Technical Specification Group Radio Access Network; Evolved Universal Terrestrial Radio Access (E-UTRA); Radio Resource Control (RRC); Protocol specification (Release 8)", Version 8.7.0, Sep. 2009.

* cited by examiner

METHOD AND APPARATUS FOR AUTONOMOUS UPLINK TIMING ADVANCE MAINTENANCE

FIELD OF THE DISCLOSURE

The disclosure relates to timing advance maintenance in a mobile device.

BACKGROUND

In order to minimize the amount of interference between uplink signals transmitted by different mobile devices to a network component such as an access node, it is often desirable to ensure that the uplink signals originating from the different mobile devices are time-synchronized when they arrive at the network component. A network component may control the mobile devices' timing so that all uplink signals arrive at the network component in an essentially synchronized fashion. Different mobile devices may be at various locations throughout the cell and have varying propagation times for their uplink transmissions. In order to ensure uplink signal synchronization at the network component, each mobile device applies an individual timing advance to its uplink transmissions. Typically, the timing advance is applied relative to the downlink reception timing that is measured by the mobile device.

A mobile device may receive regular timing advance adjustment instructions from a network component in the form of timing advance command (TAC) medium access control (MAC) control elements. These instruct the mobile device to adjust its timing advance in either a positive or negative direction. In order to determine the appropriate timing advance adjustments to issue to each mobile device, the network component measures transmitted uplink signals from each mobile device and then determines how the uplink timing has changed relative to the uplink timing that is desired at the network component. When the uplink timing of a particular mobile device's transmissions (as measured at the network component) has changed by a certain amount, the network component will issue a TAC to the mobile device in order to "fine tune" the mobile device's uplink synchronization.

Conventionally, this measurement process at the network component may require some form of transmission from the mobile device so that timing measurements can be performed. For example, if a mobile device is performing regular data (e.g. on the E-UTRA (Evolved Universal Terrestrial Radio Access) Physical Uplink Shared Channel) or control feedback (e.g. on the E-UTRA Physical Uplink Control Channel) transmissions on the uplink, then the network component can use those transmissions to conduct the necessary timing synchronization measurements. Conversely, a mobile device that is relatively idle in a traffic sense (i.e. has no data to transmit), but which is still connected to the network and therefore considered to be active, may not be performing such uplink transmissions. It may therefore be necessary for such a mobile device to make periodic SRS (Sounding Reference Signals) transmissions on the uplink. These are channel sounding transmissions that allow the network component to measure the mobile device's uplink transmission timing when other uplink transmissions are not available or are not performed. Such additional signaling can use power and reduce battery life, as well as consuming additional cell resources that could otherwise be used for data transmission.

BRIEF DESCRIPTION OF THE DRAWINGS

Some aspects of the disclosure will now be described in greater detail with reference to the accompanying diagrams, in which.

DETAILED DESCRIPTION

Figure 1:
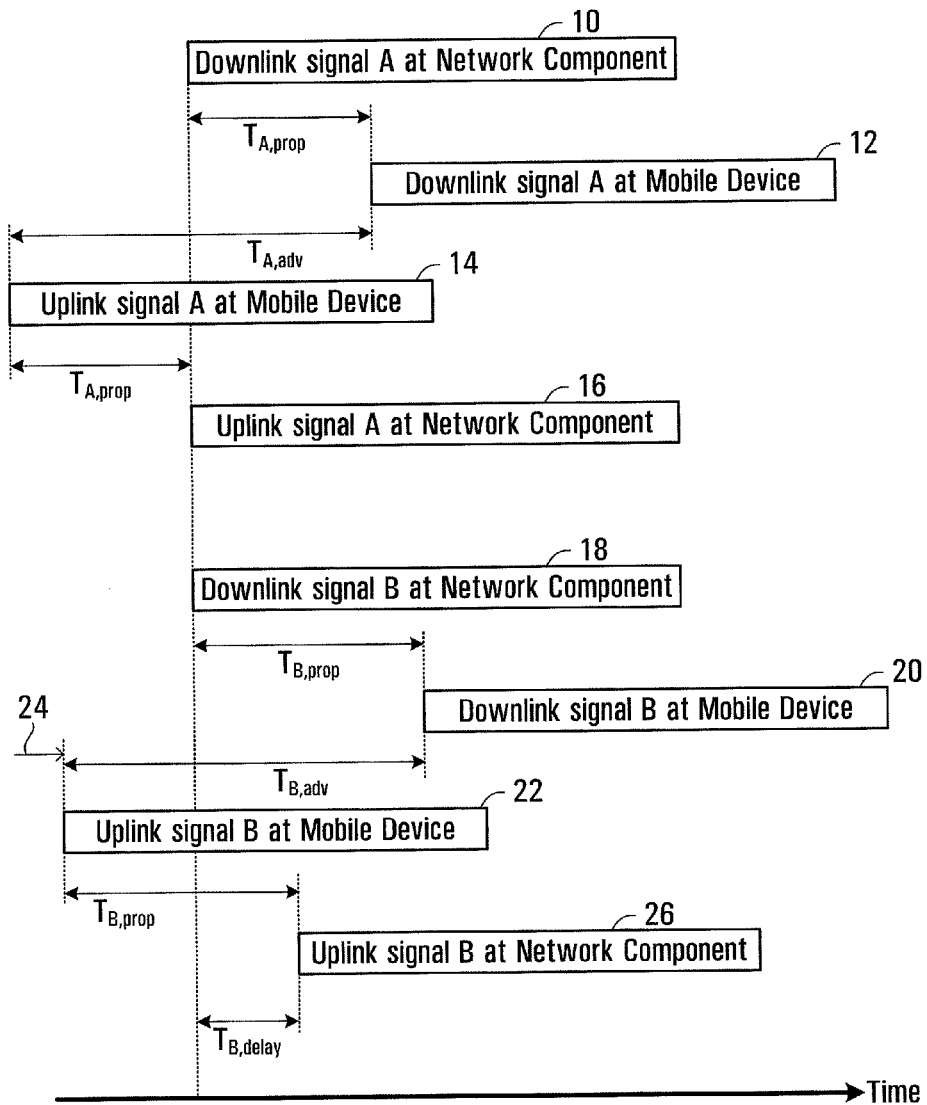
FIG. 1 is a diagram illustrating conventional timing advance maintenance.

According to one aspect of the invention, there is provided a method in a mobile device, the method comprising: calculating an adjustment of a timing advance toward a target timing advance in accordance with an adjustment parameter, the target timing advance being a function of a relative downlink timing change, the timing advance indicating uplink transmission timing relative to downlink reception timing; and upon receipt of a timing advance command, adapting the adjustment parameter based on the timing advance command and at least one of: a difference between the target timing advance and the timing advance; and the adjustment of the timing advance.

According to another aspect of the invention, there is provided a mobile device comprising: a processor; a downlink timing monitor configured for determining a relative downlink timing change; and a timing advance adjustor configured for: calculating an adjustment of a timing advance toward a target timing advance in accordance with an adjustment parameter, the target timing advance being a function of the relative downlink timing change, the timing advance indicating uplink transmission timing relative to downlink reception timing; and upon receipt of a timing advance command, adapting the adjustment parameter based on the timing advance command and at least one of: the difference between the target timing advance and the timing advance; and the adjustment of the timing advance.

According to another aspect of the invention, there is provided a computer readable medium having computer executable instructions stored thereon which, when executed by a computer, cause the computer to implement a method in a mobile device, the method comprising: calculating an adjustment of a timing advance toward a target timing advance in accordance with an adjustment parameter, the target timing advance being a function of a relative downlink timing change, the timing advance indicating uplink transmission timing relative to downlink reception timing; and upon receipt of a timing advance command, adapting the adjustment parameter based on the timing advance command and at least one of: a difference between the target timing advance and the timing advance; and the adjustment of the timing advance.

Configuring performance of adjustment of the timing advance by the mobile device may comprise: determining whether or not the mobile device is permitted to perform adjustment of the timing advance; and performing adjustment of the timing advance subject to said determination.

Determining whether or not the mobile device is permitted to perform adjustment of the timing advance may comprise determining that the mobile device is not permitted to perform adjustment of the timing advance, and performing adjustment of the timing advance subject to said determination may comprise the mobile device not performing adjustment of the timing advance.

The mobile device may signal an indication that the mobile device is not performing adjustment of the timing advance.

Determining whether or not the mobile device is permitted to perform adjustment of the timing advance may comprise determining that the mobile device is permitted to perform adjustment of the timing advance, and performing adjustment of the timing advance subject to said determination may comprise the mobile device performing adjustment of the timing advance.

The mobile device may signal an indication that the mobile device is performing adjustment of the timing advance.

The property may comprise a difference between an uplink propagation time and a downlink propagation time.

The property may comprise a difference between an uplink propagation time and a downlink propagation time, and determining whether or not the mobile device is permitted to perform adjustment of the timing advance may comprise determining that the mobile device is not permitted to perform adjustment of the timing advance if the difference between the uplink propagation time and the downlink propagation time exceeds a threshold.

Configuring performance of adjustment of the timing advance by the mobile device may comprise determining a rate for performing adjustment of the timing advance.

The property may be an estimated velocity of the mobile device.

The property may be one or more Discontinuous Reception (DRX) cycle parameters.

According to another aspect of the invention, there is provided a method in a network component comprising: determining a property of a communication channel; and based on the property, configuring performance of adjustment of the timing advance by a mobile device, adjustment of the timing advance by the mobile device comprising the mobile device calculating an adjustment of the timing advance, and the timing advance indicating uplink transmission timing relative to downlink reception timing.

The network component may be an access node.

Configuring performance of adjustment of the timing advance by the mobile device may comprise: determining whether or not the mobile device is permitted to perform adjustment of the timing advance; and signaling to the mobile device whether or not the mobile device is permitted to perform adjustment of the timing advance subject to said determination.

Determining whether or not the mobile device is permitted to perform adjustment of the timing advance subject to said determination may comprise determining that the mobile device is not permitted to perform adjustment of the timing advance, and signaling to the mobile device whether or not the mobile device is permitted to perform adjustment of the timing advance may comprise signaling to the mobile device that the mobile device is not permitted to perform adjustment of the timing advance.

Determining whether or not the mobile device is permitted to perform adjustment of the timing advance subject to said determination may comprise determining that the mobile device is permitted to perform adjustment of the timing advance, and signaling to the mobile device whether or not the mobile device is permitted to perform adjustment of the timing advance may comprise signaling to the mobile device that the mobile device is permitted to perform adjustment of the timing advance.

The property may comprise a difference between an uplink propagation time and a downlink propagation time.

The property may comprise a difference between an uplink propagation time and a downlink propagation time, and determining whether or not the mobile device is permitted to perform adjustment of the timing advance may comprise determining that the mobile device is not permitted to perform adjustment of the timing advance if the difference between the uplink propagation time and the downlink propagation time exceeds a threshold.

Configuring performance of adjustment of the timing advance may comprise determining a rate for performing adjustment of the timing advance.

The property may be an estimated velocity of the mobile device.

The property may be one or more Discontinuous Reception (DRX) cycle parameters.

According to another aspect of the invention, there is provided a mobile device comprising: a processor; a channel property determining module configured for determining a property of a communication channel; and a timing advance adjustment configuring module configured for: based on the property, configuring performance of adjustment of a timing advance by the mobile device, adjustment of the timing advance by the mobile device comprising the mobile device calculating an adjustment of the timing advance, and the timing advance indicating uplink transmission timing relative to downlink reception timing at the mobile device.

According to another aspect of the invention, there is provided a network component comprising: a processor; a channel property determining module configured for determining a property of a communication channel; and a timing advance adjustment configuring module configured for: based on the property, configuring performance of adjustment of the timing advance by the mobile device, adjustment of the timing advance by the mobile device comprising the mobile device calculating an adjustment of the timing advance, and the timing advance indicating uplink transmission timing relative to downlink reception timing at the mobile device.

According to another aspect of the invention, there is provided a method in a mobile device, the method comprising: receiving at least one timing advance command; based on the at least one timing advance command, configuring performance of adjustment of a timing advance by the mobile device, adjustment of the timing advance by the mobile device comprising the mobile device calculating an adjustment of the timing advance, and the timing advance indicating uplink transmission timing relative to downlink reception timing.

Configuring performance of adjustment of a timing advance by the mobile device may comprise: determining whether or not the mobile device is permitted to perform adjustment of the timing advance; and performing adjustment of the timing advance subject to said determination.

Determining whether or not the mobile device is permitted to perform adjustment of the timing advance may comprise determining that the mobile device is not permitted to perform adjustment of the timing advance, and performing adjustment of the timing advance subject to said determination may comprise not performing adjustment of the timing advance.

The mobile device may signal an indication that the mobile device is not performing adjustment of the timing advance.

Determining whether or not the mobile device is permitted to perform adjustment of the timing advance may comprise determining that the mobile device is permitted to perform adjustment of the timing advance, and performing adjustment of the timing advance subject to said determination may comprise performing adjustment of the timing advance.

The mobile device may signal an indication that the mobile device is performing adjustment of the timing advance.

The at least one timing advance command may comprise two or more timing advance commands, and determining whether or not the mobile device is permitted to perform adjustment of the timing advance may comprise determining that the mobile device is not permitted to perform adjustment of the timing advance if the two or more timing advance commands are received at a rate which is within a threshold of a rate at which adjustments of the timing advance have are being performed by the mobile device.

The at least one timing advance command may comprise two or more timing advance commands, and determining whether or not the mobile device is permitted to perform adjustment of the timing advance may comprise determining that the mobile device is not permitted to perform adjustment of the timing advance if the two or more timing advance commands are received at a rate which exceeds a threshold.

Determining whether or not the mobile device is permitted to perform adjustment of a timing advance may comprise determining that the mobile device may not perform adjustment of a timing advance if a value indicated by the at least one timing advance command has a magnitude which exceeds a threshold.

Determining whether or not the mobile device is permitted to perform adjustment of a timing advance may comprise determining that the mobile device is not permitted to perform adjustment of a timing advance if a value indicated by the at least one timing advance command and a timing advance adjustment calculated by the mobile device have respective magnitudes greater than a threshold but of opposite numeric signs.

Configuring performance of adjustment of a timing advance by the mobile device may comprise: determining at least one timing parameter subject to which the mobile device is permitted to perform adjustment of the timing advance; and performing adjustment of the timing advance subject to said timing parameter.

The at least one timing parameter may comprise at least one time at which adjustment of a timing advance is permitted to be performed.

The at least one timing parameter may comprise a rate at which adjustment of a timing advance is permitted to be performed.

The mobile device may, upon receipt of a timing advance command, determine a time at which the timing advance command was first transmitted, and reverse any adjustment of the timing advance performed at or after the time at which the at least one timing advance command was first transmitted to the mobile device.

According to another aspect of the invention, there is provided a method in a network component, the method comprising: transmitting at least one timing advance command to a mobile device; based on the at least one timing advance command, configuring performance of adjustment of a timing advance by the mobile device, adjustment of the timing advance comprising the mobile device calculating an adjustment of the timing advance, and the timing advance indicating uplink transmission timing relative to downlink reception timing at the mobile device.

The network component may be an access node.

Configuring performance of adjustment of the timing advance by the mobile device may comprise: determining, based on the at least one timing advance command, whether or not the mobile device is permitted to perform adjustment of a timing advance; and signaling said determination to the mobile device.

The network component or the mobile device may adapt a time alignment timer based on whether or not the mobile device is permitted to perform adjustment of the timing advance, the time alignment timer defining a period of time which, if exceeded without the mobile device receiving any timing advance command, indicates that a mobile device must perform a re-synchronization process.

Configuring performance of adjustment of a timing advance by the mobile device may comprise: determining at least one timing parameter subject to which the mobile device is permitted to perform adjustment of the timing advance by calculating and applying an adjustment of the timing advance.

According to another aspect of the invention, there is provided a mobile device comprising: a processor; a receiver for receiving at least one timing advance command; and a timing advance adjustment configuring module for: based on the at least one timing advance command, configuring performance of adjustment of a timing advance by the mobile device, adjustment of the timing advance by the mobile device comprising the mobile device calculating an adjustment of the timing advance, and the timing advance indicating uplink transmission timing relative to downlink reception timing.

According to another aspect of the invention, there is provided a network component comprising: a processor; a transmitter for transmitting at least one timing advance command to a mobile device; and a timing advance adjustment configuring module for: based on the at least one timing advance command, configuring performance of adjustment of the timing advance by the mobile device, adjustment of the timing advance comprising the mobile device calculating an adjustment of the timing advance, and the timing advance indicating uplink transmission timing relative to downlink reception timing at the mobile device.

Other aspects and features of the present disclosure will become apparent, to those ordinarily skilled in the art, upon review of the following description of the specific embodiments.

Some embodiments described herein may be suited for use in Long Term Evolution (LTE) systems such as, for example, Evolved Universal Terrestrial Radio Access (E-UTRA) (Release 8) although embodiments are not limited to LTE/E-UTRA systems. Information regarding E-UTRA systems may be found in the following:

TS 36.133, "3rd Generation Partnership Project; Technical Specification Group Radio Access Network; Evolved Universal Terrestrial Radio Access (E-UTRA); Requirements for support of radio resource management (Release 8)", Version 8.10.0, 2010-06 [hereinafter referred to as TS 36.133] at Sec.7.1.2, the content of which is hereby incorporated by reference in its entirety;

TS 36.211, "3rd Generation Partnership Project; Technical Specification Group Radio Access Network; Evolved Universal Terrestrial Radio Access (E-UTRA); Physical channels and modulation (Release 8)", Version 8.9.0, 2009-12, the content of which is hereby incorporated by reference in its entirety;

TS 36.212, "3rd Generation Partnership Project; Technical Specification Group Radio Access Network; Evolved Universal Terrestrial Radio Access (E-UTRA); Multiplexing and channel coding (Release 8)", Version 8.8.0, 2009-12, the content of which is hereby incorporated by reference in its entirety;

TS 36.213, "3rd Generation Partnership Project; Technical Specification Group Radio Access Network; Evolved Universal Terrestrial Radio Access (E-UTRA); Physical layer procedures (Release 8)", Version 8.8.0, 2009-09 [hereinafter referred to as TS 36.213], the content of which is hereby incorporated by reference in its entirety;

TS 36.321, "3rd Generation Partnership Project; Technical Specification Group Radio Access Network; Evolved Universal Terrestrial Radio Access (E-UTRA); Medium Access Control (MAC) protocol specification (Release 8)", Version 8.9.0, 2010-06, the entire contents of which is incorporated herewith; and TS 36.331, "3rd Generation Partnership Project; Technical Specification Group Radio Access Network; Evolved Universal Terrestrial Radio Access (E-UTRA); Radio Resource Control (RRC); Protocol specification (Release 8)", Version 8.10.0, 2010-06, the content of which is hereby incorporated by reference in its entirety.

Information regarding timing adjustment requirements in Code Division Multiple Access (CDMA) Evolution/Data Optimized (EV/DO) may be found in:

IS-856A (pp. 13-40)

<http://www.3gpp2.org/Public_html/specs/C.S0024-A_v1.0_040331.pdf> at Sec.13.2.1.7 and Figure 1-14-1.

It will be appreciated by one skilled in the art that the term mobile device used herein may refer to a mobile station, user equipment (in an E-UTRA system), or any other mobile wireless device capable of communicating with a wireless network. A network component, as referred to herein, includes an access node. The term access node may refer to a base station (BS), a base node, an evolved base node (eNB), a relay node, or other comparable wireless network radio receiver/transmitter components. In an LTE/E-UTRA system, an access node may be an eNB or a relay node. It is to be understood that although some embodiments are described herein as implementing an access node, other embodiments may utilize or be implemented in other network components. The terms mobile device, network component and access node are meant generically and do not limit embodiments to any particular wireless system or specification.

As mentioned above, the uplink and downlink propagation times for a mobile device may change over time. For example, a mobile device may move from one position to another, thereby changing the uplink and downlink propagation distances and times. In addition, cell conditions may change also resulting in propagation time changes. The presence or lengths or both of propagation paths between a network component such as an access node and a mobile device may be affected by environmental reflectors such as buildings, vehicles, and other objects, and these cell conditions may cause additional increases or decreases to propagation times besides the propagation time changes which are due just to a change in physical distance between the network component and the mobile device. In addition, new propagation paths may also appear or existing propagation paths may disappear or both. Therefore, a timing advance may need to be updated to account for uplink and downlink propagation time changes to ensure that a mobile device remains properly synchronized with the network component. Conventionally, a network component may be solely responsible for maintaining the timing advance for a given mobile device.

It may be desirable for a mobile device to assume some responsibility for maintaining its own timing advance. There are various situations where this is true. In a specific example of a context where this might be desirable, in some systems, from a Radio Resource Control (RRC) point of view, a powered-on mobile device can either be in the RRC_IDLE or RRC_CONNECTED states. In RRC_IDLE, the mobile device does not have an established connection with the network and therefore does not have uplink synchronization. If the mobile device wishes to communicate with the network, it must first move to RRC_CONNECTED. One of the steps in this process is to perform a random access procedure in order to gain uplink synchronization. While in RRC_IDLE, the mobile device must still "wake up" once per paging cycle in order to monitor the network component's downlink transmissions for a possible paging message. When in the RRC_CONNECTED state, a mobile device may be configured with Discontinuous Reception (DRX) parameters. DRX allows a mobile device to essentially shut down its receiver for part of the DRX cycle as a power-saving measure. In the extreme case (depending upon the exact configuration parameter settings), the mobile device may only need to "wake up" for one small period of time per DRX cycle. With long DRX cycles, maintenance of a conventional mobile device's uplink synchronization, solely by a network component, may be difficult due to extended periods of time with no transmissions in either link direction. In the event synchronization is lost, it may be necessary for such a mobile device to perform a random access procedure in the event that the mobile device wishes to make an uplink transmission. This may result in additional time being required before the mobile device can actually perform its uplink transmission. Therefore, it may be desirable for a mobile device to assume some responsibility for maintaining its own timing advance.

A conventional approach for uplink timing advance maintenance for a mobile device is that the mobile device always keeps the most recently signaled uplink timing advance from the network component relative to the observed downlink timing at the mobile device, regardless of how the downlink timing changes. The conventional mobile device may be able to determine relative downlink timing changes in order to maintain the same uplink timing advance when downlink timing changes. Specifically, in order to determine a relative downlink timing change, a mobile device may monitor the timing that downlink signals are received at the mobile device. If a mobile device detects a relative change in downlink timing, the mobile device may conventionally adjust its uplink timing accordingly to keep the same timing advance with respect to the newly determined downlink timing. For example, information regarding conventional timing advance maintenance in an E-UTRA system is found in TS 36.133, referenced above, at Sec.7.1.2 and in TS 36.213, referenced above, at Sec.4.2.3.

FIG. 1 is a diagram showing uplink and downlink timing for multiple uplink and downlink signals in a conventional wireless communication system including a network component and a mobile device. For the purposes of FIG. 1, it is assumed that uplink and downlink transmissions occur essentially periodically. The relative timing of various downlink transmissions and uplink transmissions for various uplink/downlink periods are shown in FIG. 1. When a mobile device is at position A (not shown), downlink signal A 10 is transmitted from a network component and arrives as signal A 12 at a mobile device a first propagation time $T_{A,prop}$ later. The mobile device transmits uplink signal A 14 with a timing advance $T_{A,adv}$ relative to the downlink timing as indicated in FIG. 1. A first propagation time $T_{A,prop}$ later, the uplink signal A arrives at the network component (as identified by reference character 16). In FIG. 1, it is assumed that the propagation time for both uplink and downlink transmissions is $T_{A,prop}$.

Sometime later, the mobile device has moved to a new position B (not shown) thus giving rise to a second propagation time ($T_{B,prop}$). Conventionally, the mobile device keeps the same uplink timing advance until a timing advance command (TAC) is received from the network component. In this example, no TAC has been received, and thus the timing advance at position B, $T_{B,adv}$ is the same as $T_{A,\ adv}$. With reference to FIG. 1, when the mobile device is at position B, the network component transmits downlink signal B 18 to the mobile device. The downlink propagation time is now $T_{B,prop}$. As seen in FIG. 1, in this example, $T_{B,prop}$ is greater than $T_{A,prop}$. Therefore, downlink signal B arrives at the mobile device as signal B 20 with a relative downlink timing offset of ($T_{B,prop}-T_{A,prop}$) with respect to downlink signal A. The mobile device determines that downlink timing has changed and alters the absolute uplink timing to maintain the same relative timing advance ($T_{A,\ adv}=T_{B,\ adv}$). Uplink signal B 22 is transmitted with the timing advance $T_{B,adv}$ resulting in a relative timing offset ($T_{B,prop}-T_{A,prop}$) compared to uplink signal A. Effectively, the uplink timing for uplink signal B is shifted in the direction indicated by the arrow 24. One propagation time $T_{B,prop}$ later, the uplink signal B arrives at the network component as uplink signal B 26. The combined relative uplink timing delay $T_{B,delay}$, at the network component, introduced as a result of the propagation time change is equal to two times the relative timing offset ($T_{B,prop}-T_{A,prop}$). Thus, an uplink synchronization error of $2\times(T_{B,prop}-T_{A,prop})$ may be introduced by this conventional method of uplink timing maintenance. Therefore, there is a need to provide a method of maintaining uplink synchronization which may not result in the above-described uplink de-synchronization.

Placing the entire burden of calculating timing advance adjustments on the network component can result in the need for frequent TACs to be sent to particular mobile devices, which may result in extra signaling overhead within the cell. In addition, a mobile device which is in an essentially idle state (such as the RRC_CONNECTED state with an extended DRX cycle in an E-UTRA system), may need to provide uplink transmissions (e.g. SRS) and to decode the corresponding downlink transmissions containing the TACs in order to facilitate this uplink timing advance maintenance. This signaling to maintain the timing advance can result in increased power consumption at the mobile device, thereby potentially reducing battery life. Therefore, it may be desirable to provide a method for mobile device to assume more responsibility for maintaining an accurate uplink timing advance.

A mobile device assuming more responsibility to maintain an accurate uplink timing advance may reduce the amount of uplink and downlink control overhead signaling that must be performed within the cell. This can be accomplished by the mobile device determining changes in the observed downlink timing, translating these into a corresponding change in the uplink propagation timing, and then adjusting its own uplink timing advance based on this information. This may allow the mobile device to maintain uplink synchronization for a longer period of time without the need for the network component to issue a TAC to that mobile device. An adjustment of a timing advance calculated and possibly applied by a mobile device may be referred to herein as a self-adjustment or an autonomous adjustment of the timing advance. A self-adjustment or autonomous adjustment is to be contrasted with a commanded adjustment which results from a timing advance command from a network component to a mobile device. Specifically, when a self-adjustment or autonomous adjustment is performed, such an adjustment is not triggered by a timing advance command.

According to some embodiments, and by way of example, a mobile device may calculate an adjustment to its uplink timing advance as a function of a determined relative downlink timing change. For example, in some embodiments, the mobile device which has moved from position A to position B, thereby resulting in an uplink/downlink propagation time delay, calculates an adjustment to its uplink timing advance according the following:

$$T_{B,adv} = T_{A,adv} + 2 \cdot (T_{B,prop} - T_{A,prop})$$

where $T_{A,adv}$ is the timing advance at position A, $T_{B,adv}$ is the new timing advance at position B, $T_{A,prop}$ is the uplink/downlink propagation time at position A, and where $T_{B,prop}$ is the uplink/downlink propagation time at position B. The equation above assumes uplink and downlink propagation times to be equal. Embodiments described herein may utilize the timing advance adjustment calculation described above. However, it is to be understood that embodiments are not limited to those utilizing the above equation. Uplink timing maintenance using this approach will be described with reference to FIG. 2.

Figure 2:
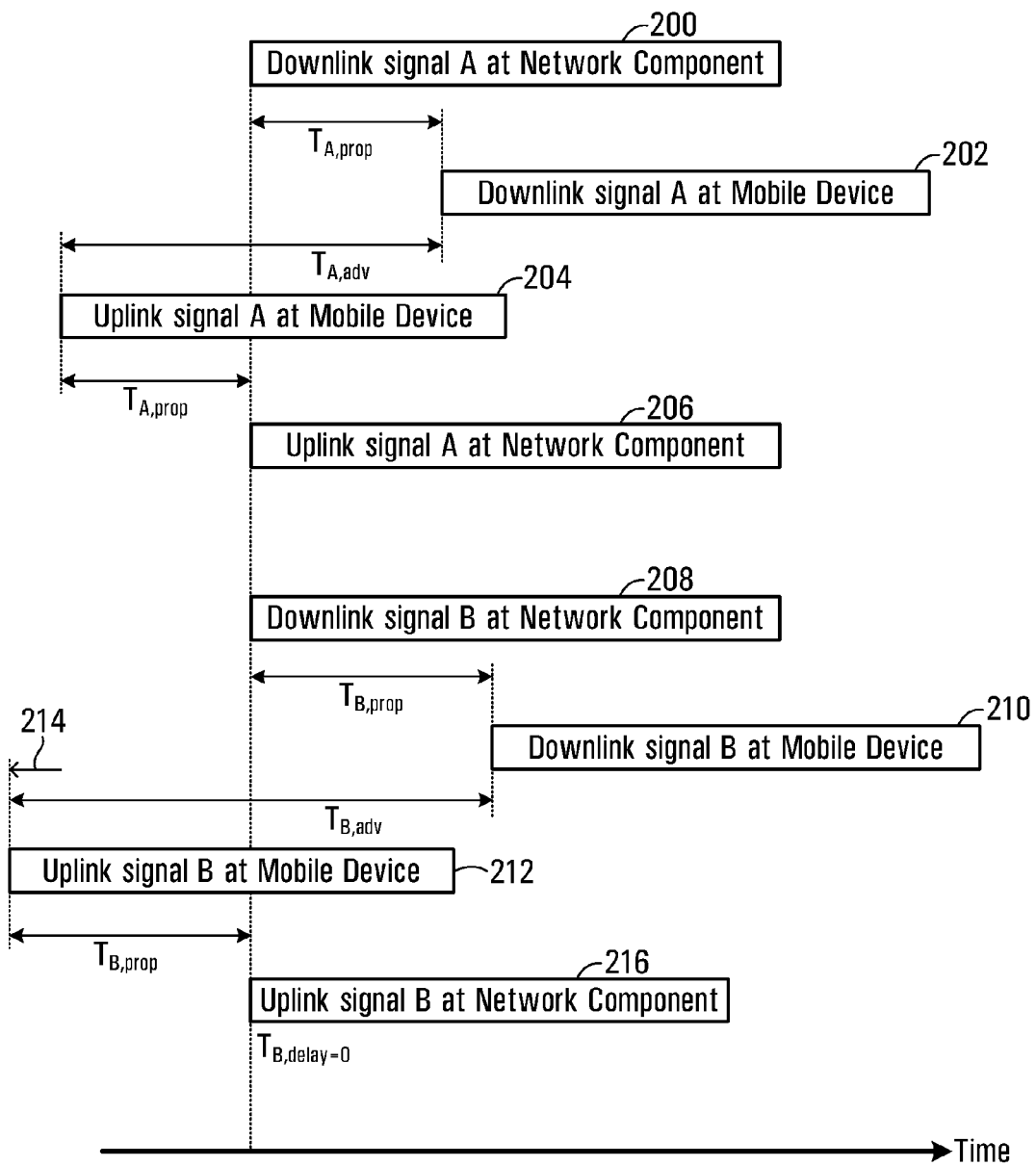
FIG. 2 is a diagram illustrating an example of timing advance maintenance in which the timing advance is adjusted based on a relative downlink timing change.

FIG. 2 is a diagram illustrating how uplink timing may be maintained by adjusting the timing advance as described above. In FIG. 2 downlink signal A 200 is transmitted and received as downlink signal A 202, uplink signal A 204 is transmitted and received as uplink signal 206 and downlink signal B 208 is transmitted and received as downlink signal B 210 with the same timing as in FIG. 1. However, as shown in FIG. 2 the timing advance for position B ($T_{B,adv}$) is adjusted to account for the relative downlink timing change according to the following equation: $T_{B,adv} = T_{A,adv} + 2 \cdot (T_{B,prop} - T_{A,prop})$. As can be seen in FIG. 2, uplink signal B 212 is transmitted with the new timing advance $T_{B,adv}$. Effectively, the uplink timing for uplink signal B is shifted in the direction indicated by the arrow 214. As can be seen, in FIG. 2 timing for uplink signal B is shifted in the opposite direction as in FIG. 1. This results in the downlink signal B 216 arriving at the network component with no relative uplink timing delay at the network component (i.e. $T_{B,delay}=0$). Thus, by adjusting the timing advance in this manner, uplink synchronization may be maintained for a mobile device. In some embodiments, a mobile device may be able to maintain its uplink synchronization at the network component without the need for the network component to actually signal any timing advance adjustments to the mobile device. However, in some embodiments, a network component still generates and transmits TACs to the mobile device.

A mobile device may not know the exact time that a downlink signal was transmitted by a network component. Hence, the mobile device may be unable determine the absolute values of $T_{A,prop}$ and $T_{B,prop}$. However, conventionally a mobile device may be able to determine the relative change in downlink propagation times (i.e. $T_{B,prop} - T_{A,prop}$) by monitoring the times at which the downlink signals are received at a mobile device. The relative change in downlink propagation times (i.e. $T_{B,prop} - T_{A,prop}$) is the quantity that is required in the above equation. The mobile device may measure or estimate the relative downlink timing change based on the timing of downlink signals received at the mobile device. For example, the mobile device may make one or more measurements of the downlink timing. These individual measurements may be corrupted by noise, however. Consequently, the mobile device may use at least one measurement in order to estimate the relative downlink timing change. Using multiple measurements when generating an estimate may potentially reduce the effects of noise.

Figure 3:
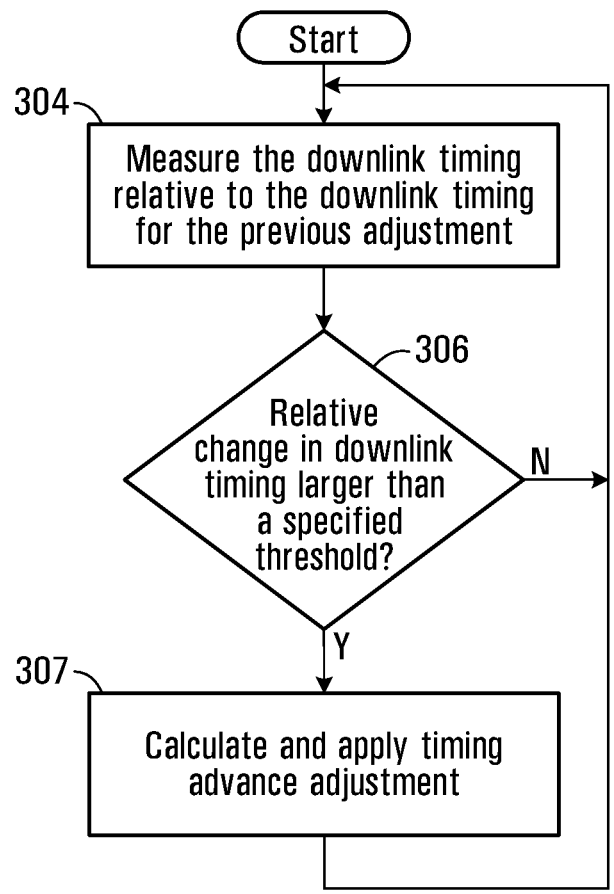
FIG. 3 is a flowchart of a method of calculating and applying timing advance adjustments.

FIG. 3 is a flowchart of a method of performing mobile timing advance self-adjustments in accordance with some embodiments. The method may, for example be performed at configured intervals. At block 304, the mobile device measures or estimates the current downlink timing relative to the downlink timing for the previous adjustment. At block 306, the mobile device determines if the relative change in downlink timing (if any) is larger than a configured threshold. If the relative change in downlink timing is less than this threshold, then it is not currently necessary for the mobile device to calculate and apply an uplink timing advance adjustment and the method ends. Conversely, if the relative downlink timing has changed by an amount greater than the specified threshold, the method will proceed to step 307. At block 307, the mobile device calculates an uplink timing advance adjustment and then applies this adjustment to its uplink transmission timing and the method ends. In order to calculate the uplink timing advance adjustment, the mobile device may, for example, utilize the equation $T_{B,adv} = T_{A,adv} + 2 \cdot (T_{B,prop} - T_{A,prop})$ described above. It is to be understood that the above method of adjusting a timing advance in a mobile device is provided as an example only and embodiments described herein are not limited to those implementing the above equation. A mobile device may utilize a different function for calculating adjustments to the timing advance, and embodiments are not limited to the particular function described above. For example, in some embodiments, the timing advance is adjusted by a product of a determined relative downlink timing change and a multiplier value as given by the following equation: $T_{B,adv} = T_{A,adv} + \alpha \cdot (T_{B,prop} - T_{A,prop})$, where $1 \leq \alpha \leq 2$, a being a multiplier value. This may help to avoid overcompensating for a change in propagation times which may in turn lead to timing instability. In another embodiment, $\alpha$ may be outside the range of $1 \leq \alpha \leq 2$ (e.g. less than 1 or greater than 2).

It should be noted that the network component may still issue TACs to mobile devices at various points in time (e.g. in order to compensate for any long-term accumulated timing advance adjustment errors by a mobile device). However, the application of the method described above with respect to FIG. 3 may allow the time interval between successive TACs to be significantly increased, thereby reducing the control overhead signaling and processing issues.

In some embodiments, the mobile device is configured to make incremental changes to its timing advance rather than making a single adjustment to its timing advance that accounts for all of a determined relative downlink timing change. This may be advantageous, to avoid problems such as at least one of timing instability, adjustment overshoot, and undesirable interactions between mobile device-originated and network component-originated uplink timing advance adjustments.

In some embodiments, a mobile device may calculate an overall required or target timing advance based on a measured relative downlink timing change. The target timing advance represents the value of the timing advance if the full required adjustment to the timing advance calculated based on a determined relative downlink timing change was applied. The target timing advance may be calculated using methods described above. Rather than adjust the timing advance to meet the target timing advance all at once, the mobile device in some embodiments calculates a series of smaller adjustments toward the target timing advance in accordance with one or more timing advance adjustment parameters, hereinafter simply referred to as adjustment parameters. An example of an adjustment parameter is an adjustment step size; another example of an adjustment parameter is a time interval at which individual adjustments are calculated or applied (referred to herein as an adjustment time interval).

Some embodiments provide a method of dynamically adapting an adjustment parameter. This may improve the effectiveness of self-adjustments performed by the mobile device. This may prove particularly effective where if adjustments made in accordance with a fixed adjustment parameter, such as an adjustment step size or adjustment timing interval, this may result in the timing advance being adjusted too quickly resulting in an over adjustment. Conversely, the timing advance may not be adjusted fast enough to compensate for the rate at which propagation times are changing for a mobile device, and adjustment parameter adaptation can be employed to deal with this.

Embodiments relating to a mobile device performing adjustments of its timing advance in accordance with an adjustment parameter such as an adjustment step size and an adjustment interval will now be described with reference to FIGS. 4 to 11C.

Figure 4:
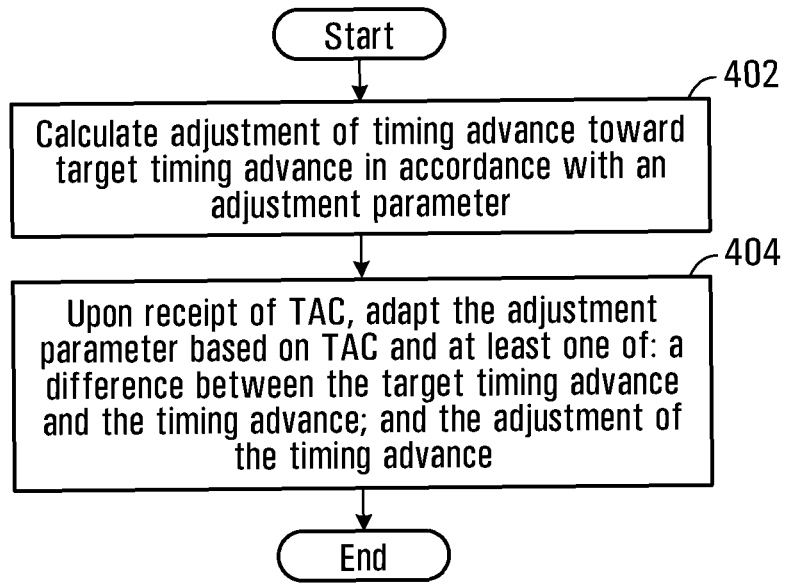
FIG. 4 is a flowchart of a method of adapting a timing adjustment parameter.

FIG. 4 is a flowchart of a method in a mobile device according to an embodiment of the disclosure. At block 402, the mobile device calculates an adjustment of a timing advance toward a target timing advance in accordance with an adjustment parameter. The target timing advance is a function of a relative downlink timing change. The mobile device may determine a relative downlink timing change as described above. As also mentioned above, the adjustment parameter may be an adjustment step size or a timing interval in some embodiments.

Where the adjustment parameter is an adjustment step size, calculating an adjustment of the timing advance in accordance with the adjustment parameter involves limiting the adjustment of the timing advance to at most the adjustment step size such that the actual timing advance is only adjusted in step size increments toward the target timing advance. In some embodiments, if the difference between the current unadjusted timing advance and the target timing advance is less than the adjustment step size, the calculated adjustment is set to be equal to the difference. Other adjustment calculation methods may be implemented in some embodiments. At block 404, upon receipt of a TAC, the mobile device adapts the adjustment parameter based on the received TAC and at least one of: the adjustment of the timing advance; and a difference between the target timing advance and the timing advance before the TAC has been applied. Detailed examples of such adaptation are provided below. While blocks 402 and 404 are shown as being in a particular sequence, in practice this may not be the case. Rather, step 404 may be performed whenever a TAC is received. Furthermore, step 402 is performed whenever it is time for the mobile device to perform self-adjustment of the timing advance.

In some embodiments, after performing the method of FIG. 4, a mobile device calculates one or more further adjustments of the timing advance in accordance with the thus adapted adjustment parameter.

In some embodiments, at block 404, the adjustment parameter remains unchanged if certain conditions are satisfied; for example, if the difference between the target timing advance and the timing advance before the TAC has been applied is less than a specified margin (such that the target timing advance and the timing advance before the TAC has been applied are consequently approximately equal).

Figure 5:
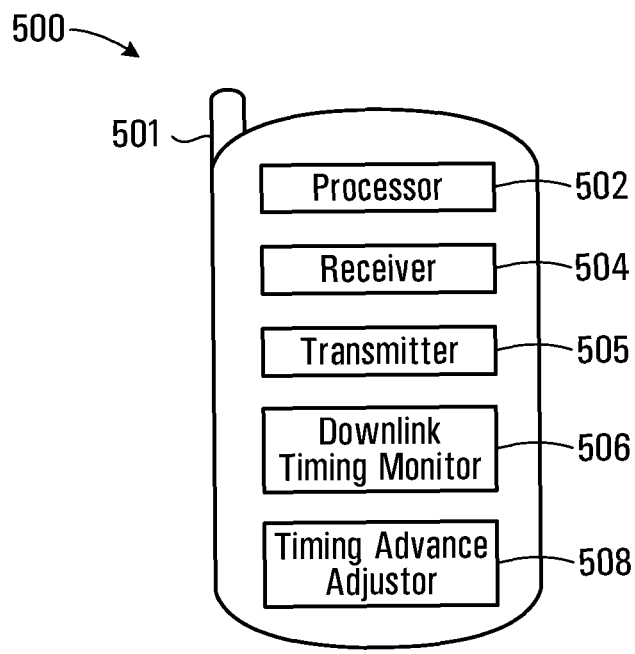
FIG. 5 is a block diagram of a mobile device having a downlink timing monitor and a timing advance adjustor.

FIG. 5 is a block diagram of an example mobile device 500 which may perform self-adjustment of its timing advance in accordance with the method of FIG. 4. The mobile device 500 comprises at least one antenna 501, a processor 502, a receiver 504, transmitter 505, a downlink timing monitor 506 and a timing advance adjustor 508. The mobile device 500 may have other components that are not shown. The receiver 504 is configured to receive downlink signals inclusive of TACs from a network component. The downlink timing monitor 506 is configured to monitor downlink timing and to determine relative changes in downlink timing. In a specific example, the downlink timing monitor 506 monitors the timing that downlink signals are received from the network component and observes a relative shift in that timing. The timing advance adjustor 508 is configured to calculate adjustments of the timing advance and to adapt the adjustment parameter in accordance with the method described with reference to FIG. 4. The timing advance adjustor 508 is also configured to process a received TAC adjusting the timing advance by a value indicated in a received TAC, the value indicating an adjustment of the timing advance. The value indicated in the TAC may be referred to as the TAC herein for simplicity. The timing advance adjustor 508 may be implemented as a memory containing instructions for execution by processor 502, by hardware, or by a combination of instructions stored in a memory and additional hardware, to name a few examples. The mobile device 500 may be configured to implement other methods which are described herein together in combination with the method of FIG. 4.

Recall that at block 404 of FIG. 4, upon receipt of a TAC, the mobile device adapts the adjustment parameter based on the received TAC and at least one of: the adjustment of the timing advance; and a difference between the target timing advance and the timing advance before the TAC is applied. In a specific example, the mobile device adapts the adjustment parameter based on the received TAC and the adjustment of the timing advance which was calculated by the mobile device. In another specific example, the mobile device adapts the adjustment parameter based on the received TAC and the difference between the target timing advance and the timing advance before the TAC is applied. In yet another specific example, the mobile device adapts the adjustment parameter based on both the calculated adjustment of the timing advance and the difference between the target timing advance and the timing advance before the TAC is applied.

Figure 6:
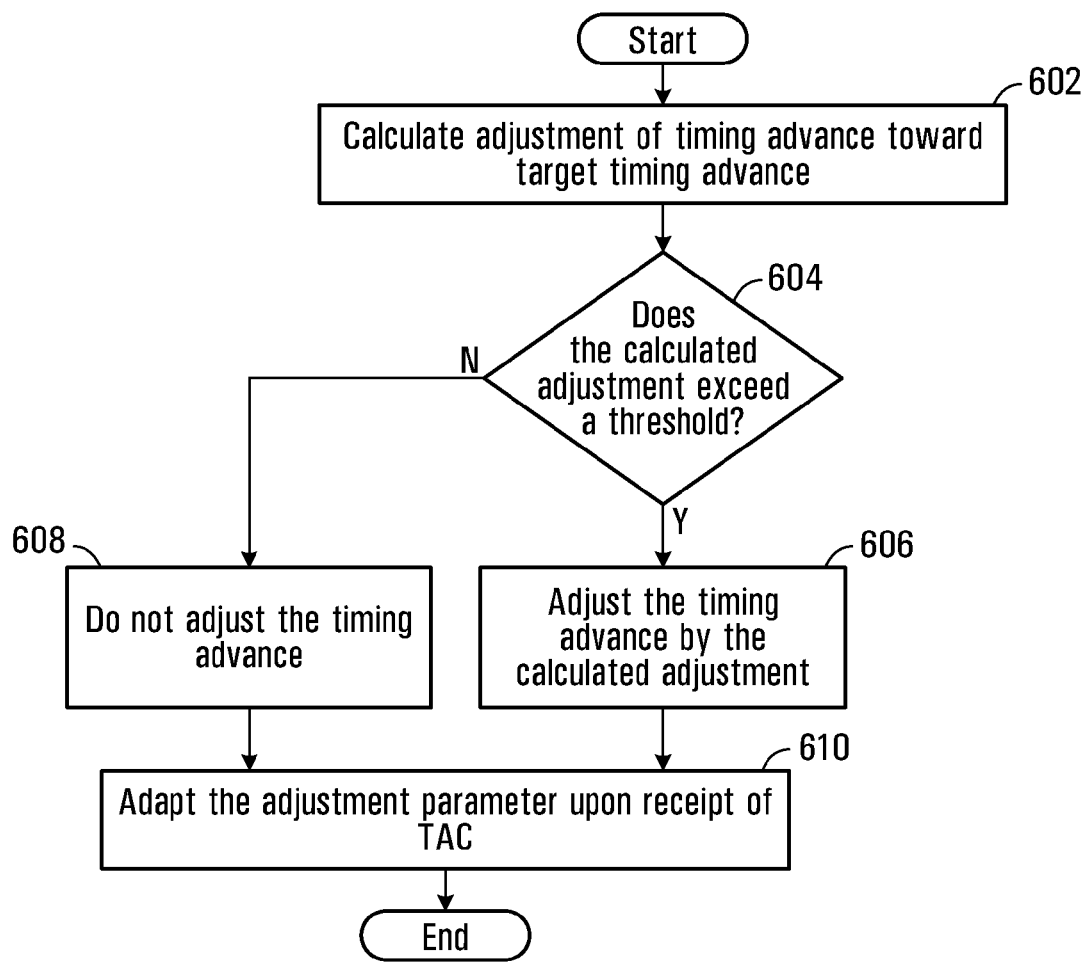
FIG. 6 is a flowchart of a method of adapting an adjustment parameter.

In some embodiments, a mobile device is configured to apply a calculated adjustment of the timing advance only if the calculated adjustment exceeds a threshold. FIG. 6 is a flowchart of a specific example of the method of FIG. 4 in which an adjustment threshold is implemented. At block 602, the mobile device calculates an adjustment of a timing advance toward a target timing advance in accordance with an adjustment parameter (as described above with reference to step 402 of FIG. 4). At block 604, the mobile device determines whether the calculated adjustment exceeds a threshold. If the calculated adjustment exceeds the threshold (yes path, block 604), then at block 606, the mobile device adjusts the timing advance by the calculated adjustment and the method proceeds to block 610. If the calculated adjustment does not exceed the threshold (no path, block 604) then at block 608, the mobile device does not adjust the timing advance and the method proceeds to block 610. At block 610, the adjustment parameter is adapted upon receipt of a TAC in the same manner as block 404 of FIG. 4. While the adjustment of the timing advance (blocks 602-608) and the adaptation of the adjustment parameter upon receipt of TAC (block 610) are shown as being in a particular sequence, in practice this may not be the case. Rather, block 610 is performed whenever a TAC is received. Furthermore, blocks 602-608 are performed whenever it is time for the mobile device to perform self-adjustment of the timing advance.

Detailed examples of how an adjustment parameter, such as an adjustment time interval may be adapted will now be described with reference to FIGS. 7 to 10.

Figure 7:
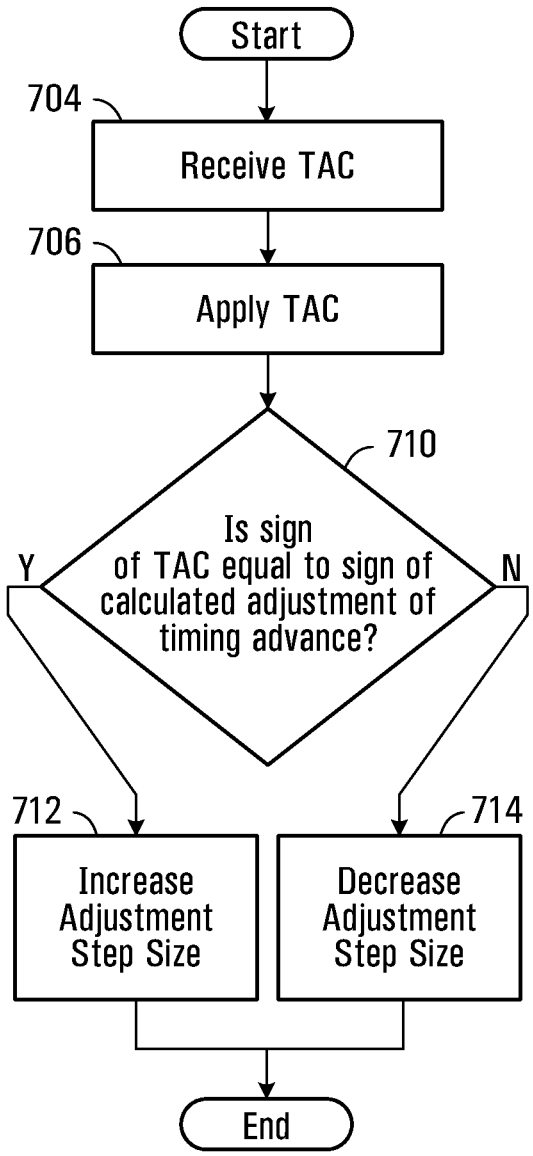
FIG. 7 is a flowchart of a method of adapting an adjustment step size.

FIG. 7 is a flowchart of a method which shows details of how an adjustment parameter may be adapted in some embodiments. In the method shown in FIG. 7, the adjustment parameter is the adjustment step size. The method of FIG. 7 is triggered by the receipt of a timing advance command at block 704. At block 706, the mobile device applies the TAC. Specifically, the mobile device adjusts the timing advance by a value indicated in the received TAC. In some embodiments, the mobile device also sets the target timing advance to be equal to the thus-adjusted timing advance at this step. By setting the target timing advance to be equal to the thus-adjusted timing advance, the mobile device will not perform further adjustments of the timing advance until the mobile device detects another downlink timing change or receives a TAC.

At block 710, the mobile device compares the received TAC with an adjustment to the timing advance calculated by the mobile device (for example, the most recently calculated adjustment). In this embodiment, the mobile device compares the numeric sign of the value indicated in the value indicated in the TAC with the numeric sign of the adjustment calculated by the mobile device. If the TAC adjusts the timing advance in the same direction as the adjustment calculated by the mobile device (i.e. if the numeric signs of the value indicated in the timing advance and the adjustment calculated by the mobile device are the same) (yes path), then in block 712 the adjustment size is increased. In this scenario, the mobile device may not have made large enough or fast enough adjustments to account for the actual relative change in relative downlink timing. Turning back to block 710, if the TAC adjusts the timing advance in the opposite direction as the adjustment calculated by the mobile device (i.e. if the numeric signs of the value indicated in the TAC and the adjustment calculated by the mobile device are different) (no path) then in block 714, the adjustment step size is decreased. In this scenario, the mobile device may have over-adjusted the timing advance, or may have made larger than required adjustments to deal with the actual relative change in downlink timing. Whenever self-adjustment of the timing advance is to be performed, the self-adjustment is performed based on the adjustment step size thus determined, for example using the method of FIG. 4 or 6.

Figure 8:
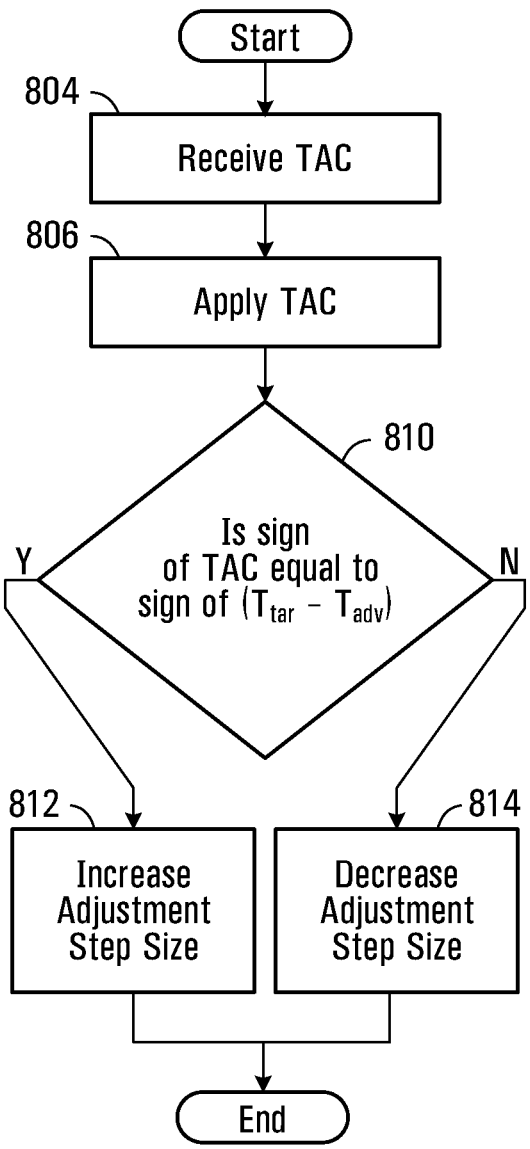
FIG. 8 is a flowchart of another method of adapting an adjustment step size.

FIG. 8 is a flowchart of a method which shows details of how an adjustment parameter is adapted in another embodiment. Blocks 804, 806, 812 and 814 are the same as blocks 704, 706, 712, 714 in FIG. 7 and the description will not be repeated. At block 810, the mobile device compares the received TAC with the difference between the target timing advance and the timing advance before the TAC is applied. In this embodiment, the mobile device compares the numeric sign of the value indicated in the value indicated in the TAC with the numeric sign of the difference between the target timing advance ($T_{tar}$) and the timing advance before the TAC is applied ($T_{adv}$). If the numeric sign of the value indicated in the TAC and the numeric sign of the difference between the target timing advance and the timing advance before the TAC is applied are the same, the method continues with block 812. If the numeric sign of the value indicated in the TAC and the numeric sign of the difference between the target timing advance and the timing advance before the TAC is applied are different, then the method continues at block 814. Whenever self-adjustment of the timing advance is to be performed, the self-adjustment is performed based on the adjustment step size thus determined, for example using the method of FIG. 4 or 6.

In some embodiments, the adjustment step size may be limited by a maximum or a minimum adjustment step size or both. In some embodiments, the adjustment step size may be increased or decreased by a percentage of the current adjustment step size. In other embodiments, the adjustment step size may be increased or decreased by a fixed value.

Figure 9:
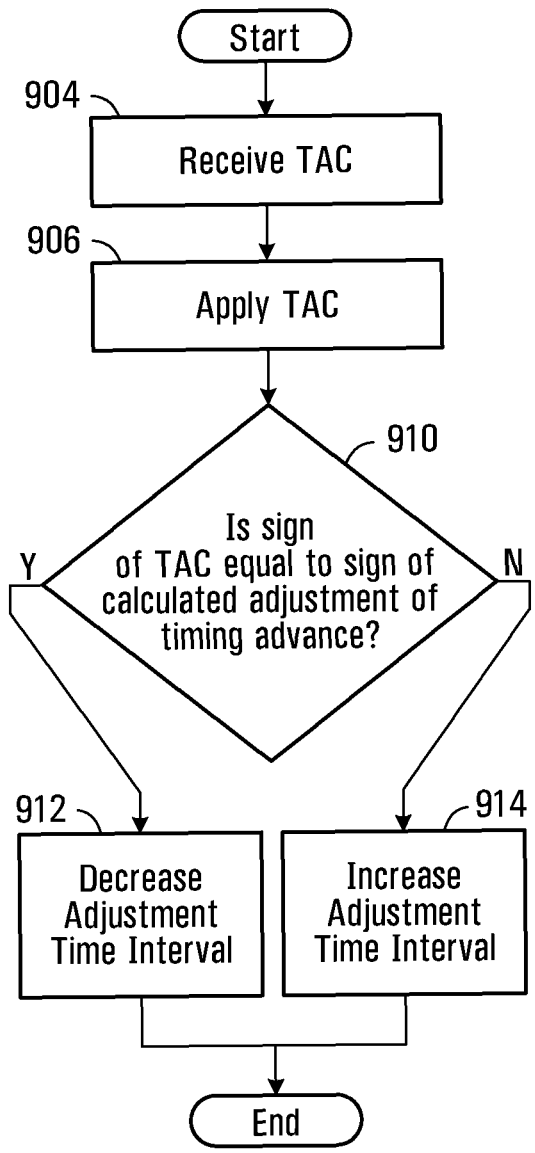
FIG. 9 is a flowchart of a method of adapting an adjustment timing interval.

FIG. 9 is a flowchart of a method which shows details of how an adjustment parameter is adapted in a further embodiment. In the method shown in FIG. 9, the adjustment parameter is an adjustment time interval. The method of FIG. 9 is triggered by the reception of a timing advance command at block 904. Blocks 904 and 906 are the same as blocks 704 and 706 in FIG. 7 and the description will not be repeated. At block 910, the mobile device compares the received TAC with an adjustment to the timing advance calculated by the mobile device (for example, the most recently calculated adjustment). In this embodiment, the mobile device compares the numeric sign of the value indicated in the TAC with the numeric sign of the adjustment calculated by the mobile device. If the numeric signs of the value indicated in the TAC and the adjustment calculated by the mobile device are the same, then the method continues at block 912, and the adjustment time interval is decreased, thereby increasing the rate at which the mobile device can adjust the timing advance. In this scenario, the mobile device may not have adjusted the timing advance fast enough to account for the actual relative change in downlink timing. Turning back to block 910, if the numeric signs of the value indicated in the TAC and the adjustment calculated by the mobile device are different, then at block 914, the adjustment time interval is increased, thereby decreasing the rate at which the mobile device can adjust the timing advance. In this scenario, the mobile device may have over-adjusted the timing advance based on the actual relative change in downlink timing. The mobile device then performs self-adjustment of the timing advance at timing intervals set by the adjustment time interval thus adapted. Any method of self-adjustment may be performed; this may involve use of an adjustment step size or not. For example, the method of either FIG. 4 or 6 may be used for calculating a self-adjustment.

Figure 10:
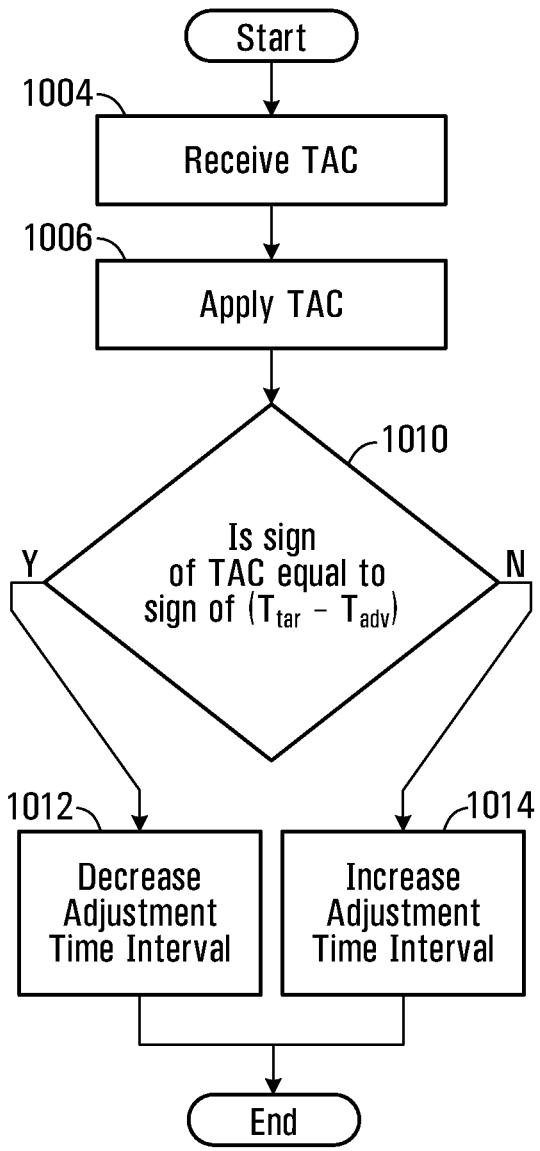
FIG. 10 is a flowchart of another method of adapting an adjustment timing interval.

FIG. 10 is a flowchart of a method which shows details of how an adjustment parameter is adapted in a further embodiment. In the method shown in FIG. 10, the adjustment parameter is an adjustment time interval. Blocks 1004, 1006, 1012, and 1014 are the same as blocks 904, 906, 912, and 914 of FIG. 9, and these will not be described again here. At block 1010, the mobile device compares the received TAC with the difference between the target timing advance and the timing advance before the TAC is applied. In this embodiment, the mobile device compares the numeric sign of the value indicated in the value indicated in the TAC with the numeric sign of the difference between the target timing advance and the timing advance before the TAC is applied. If the numeric sign of the value indicated in the TAC and the numeric sign of difference between the target timing advance and the timing advance before the TAC is applied are the same, then the method continues at block 1012 in which case the adjustment time interval is decreased. Turning back to block 1010, if the numeric sign of the value indicated in the TAC and the numeric sign of the difference between the target timing advance and the timing advance before the TAC is applied are different, then the method continues at block 1014 in which case the adjustment time interval is increased. Again, any method of self-adjustment may be performed such as the method of either FIG. 4 or 6.

In some embodiments, the adjustment time interval may be limited by a maximum or a minimum adjustment time interval or both. In some embodiments, the adjustment time interval may be increased or decreased by a percentage of the current adjustment time interval. In other embodiments, the adjustment time interval may be increased or decreased by a fixed value.

It is to be understood that the timing advance calculation and adjustment methods described above with reference to FIGS. 7 to 10 are only examples of adjustment parameter adaptation and self-adjustment of the timing advance calculation. Other embodiments described herein may utilize these methods. Other embodiments described below may not utilize the above calculation methods and may function independently of what has been described thus far.

The methods of adapting an adjustment parameter described above may have the advantage that self-adjustments performed by a mobile device are better able to cope with changing downlink and uplink propagation times which may lead to greater timing and synchronization stability.

Figure 11A:
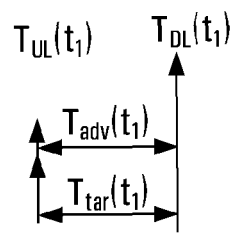
FIGS. 11A to 11C are more diagrams illustrating examples of timing advance maintenance.
Figure 11B:
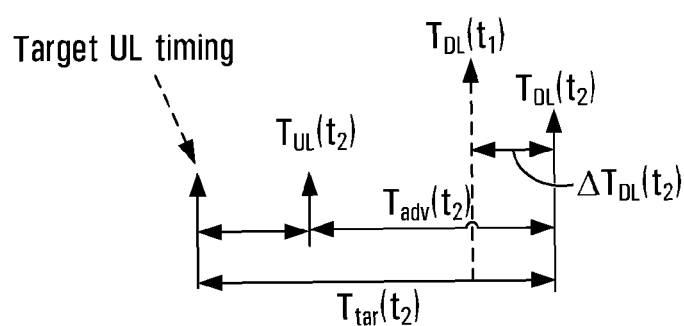
Figure 11C:
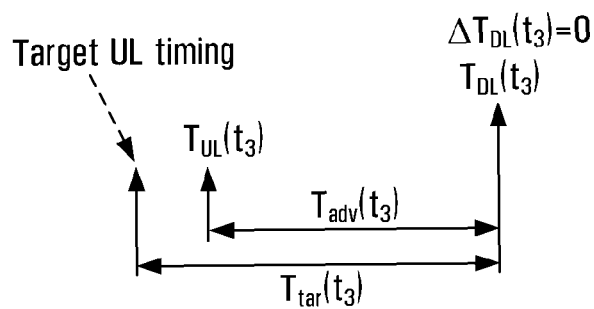

As described above, the timing advance may be adjusted in steps toward a target timing advance. In some embodiments, a target timing advance may be updated less frequently than timing advance adjustments are calculated. In other embodiments, a target timing advance may be updated (based on a relative downlink timing change) every time a timing advance adjustment is calculated. FIGS. 11A to 11C are diagrams illustrating an example of how a timing advance and a target timing advance may be updated in some embodiments. FIGS. 11A to 11C show uplink timing relative to downlink timing at different times and also show two consecutive adjustments to the timing advance separated by a time interval. In this example, the relative downlink timing is monitored for each adjustment of the timing advance.

FIG. 11A shows an uplink timing $T_{UL}(t_1)$ of a mobile device and a downlink timing $T_{DL}(t_1)$ of the mobile device at a first time instant $t_1$. Specifically, $T_{UL}(t_1)$ is the timing at which the mobile device transmits uplink transmissions to a network component and $T_{DL}(t_1)$ is the timing at which downlink transmissions are received at the mobile device. $T_{UL}(t_1)$ is shown relative to $T_{DL}(t_1)$. $T_{adv}(t_1)$ is the current timing advance of the mobile device at time instant $t_1$. $T_{tar}(t_1)$ is the target timing advance at $t_1$. In this example, at $t_1$, the target timing advance is equal to the current timing advance of a mobile device.

FIG. 11B shows the uplink timing $T_{UL}(t_2)$ of the mobile device and a downlink timing $T_{DL}(t_2)$ of the mobile device at a second time instant $t_2$. At $t_2$, the mobile device calculates and applies an adjustment to both the current timing advance and the target timing advance. At time $t_2$, the downlink timing $T_{DL}(t_2)$ observed by the mobile device has changed by the amount $\Delta T_{DL}(t_2)$ relative to $T_{DL}(t_1)$. Specifically, the relative downlink timing change may be calculated by the following:

$$\Delta T_{DL}(t_2) = T_{DL}(t_2) - T_{DL}(t_1).$$

The relative downlink timing change may be positive or negative. The mobile device determines the relative downlink timing change $\Delta T_{DL}(t_2)$. Because the downlink timing has changed, keeping the timing advance the same as at the first time instant $t_1$ will result in an uplink timing error of two times $\Delta T_{DL}(t_2)$, as explained above with respect to FIG. 1. Therefore, the target timing advance is adjusted by the following equation at $t_2$:

$$T_{tar}(t_2) = T_{tar}(t_1) + 2\Delta T_{DL}(t_2)$$

where $T_{tar}(t_2)$ is the target timing advance at $t_2$. However, the actual timing advance employed by the mobile device is not adjusted by the same amount. Rather, in this embodiment, the timing advance is adjusted according to the following formula:

$$T_{adv}(t_2) = T_{adv}(t_1) + \Delta T_{DL}(t_2) + \mu \cdot \text{sign}[T_{tar}(t_1) - T_{adv}(t_1)]$$

where $T_{adv}(t_2)$ is the timing advance at $t_2$, $\mu$ is an adjustment step size, and where $\text{sign}[T_{tar}(t_1) - T_{adv}(t_1)]$ is given by the following table:

| IF | THEN |
|---|---|
| $T_{tar}(t_1) > T_{adv}(t_1)$ | $\text{sign}[T_{tar}(t_1) - T_{adv}(t_1)] = 1$ |
| $T_{tar}(t_1) < T_{adv}(t_1)$ | $\text{sign}[T_{tar}(t_1) - T_{adv}(t_1)] = -1$ |
| $T_{tar}(t_1) = T_{adv}(t_1)$ | $\text{sign}[T_{tar}(t_1) - T_{adv}(t_1)] = 0$ |

In this example, $\mu \cdot \text{sign}[T_{tar}(t_1) - T_{adv}(t_1)] = 0$, and, therefore, $T_{adv}(t_2) = T_{adv}(t_1) + \Delta T_{DL}(t_2)$.

FIG. 11C shows the uplink timing $T_{UL}(t_3)$ of the mobile device and a downlink timing $T_{DL}(t_3)$ of the mobile device at a third time instant $t_3$. At $t_3$, the mobile device again calculates and applies an adjustment to both the current timing advance and the target timing advance. However, at $t_3$, the relative downlink timing with respect to $t_2$ has not changed. Therefore, $\Delta T_{DL}(t_3) = 0$ where $\Delta T_{DL}(t_3)$ is the relative downlink timing change at $t_3$. Using the similar equations as given above, and since $T_{tar}(t_2) > T_{adv}(t_2)$, the mobile device calculates the target timing advance and the timing advance at $t_3$ as follows:

$$T_{tar}(t_3) = T_{tar}(t_2) + 2 \cdot \Delta T_{DL}(t_3) = T_{tar}(t_2) + 2 \cdot 0 = T_{tar}(t_2); \text{ and}$$

$$T_{adv}(t_3) = T_{adv}(t_2) + \Delta T_{DL}(t_3) + \mu \cdot \text{sign}[T_{tar}(t_2) - T_{adv}(t_2)] = T_{adv}(t_2) + \mu.$$

Therefore, as can be seen by the above equation, and in FIG. 11C, the timing advance at $t_3$ is adjusted toward the target timing advance by the adjustment step size amount. If the relative downlink timing remains unchanged, future adjustments will continue to move the timing advance toward the target timing advance in increments limited by the adjustment step size until the timing advance equals the target timing advance. In some embodiments, when the remaining difference between the target timing advance and the timing advance is less than the adjustment step size, the timing advance is adjusted by the remaining difference amount, rather than by the adjustment step size.

Again, it is to be understood that the timing advance calculation and adjustment methods described above are only examples of adjustment parameter adaptation and self-adjustment of the timing advance calculation. Other embodiments described herein may or may not implement these methods.

The effectiveness and desirability of a mobile device performing self-adjustments of its timing advance may depend on various factors such as channel quality, propagation time, the timing of TACs received by the mobile device, etc. Therefore, it may be desirable in some embodiments to configure the performance of such self-adjustments based on these factors. For example, it may not be desirable for a mobile device which has the capability to perform self-adjustment of its timing advance to utilize this capability in all scenarios. In addition, it may be desirable for a mobile device to perform self-adjustments of its timing advance at certain rates or at certain times or both.

In some embodiments, a network component or a mobile device may configure performance of mobile device self-adjustments to the timing advance based on a property of a communication channel, for example a channel between the network component and mobile device. For example, a network component or a mobile device may, based on the property of the communication channel, determine that no self-adjustments of the mobile device's timing advance should be permitted. For certain channel conditions, it may be that self-adjustments may not be accurate or may cause timing advance stability problems or both, and refraining from performing self-adjustments in such conditions may avoid these problems. Embodiments which will now be described below and with reference to FIGS. 12 to 17 may be implemented in conjunction with, or independently from the embodiments described above.

Figure 12:
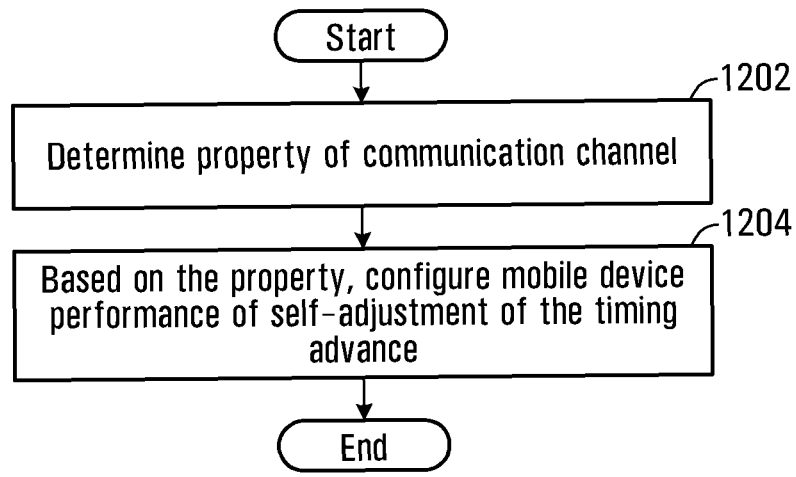
FIG. 12 is a flowchart of a method of configuring mobile device timing advance adjustment based on a property of a communication channel.

FIG. 12 is a flowchart of a method in a network component according to some embodiments for configuring performance of a mobile device's self-adjustments of the timing advance. At block 1202, the network component determines a property of a communication channel. In this embodiment, the communication channel is between the network component and the mobile device. However, in some embodiments, a network component may evaluate a property of a communication channel between one or more other mobile devices. For example, a network component may evaluate channel conditions for an entire cell in some embodiments. At block 1204, the network component configures performance of self-adjustment of the timing advance by the mobile device based on the property. As described above, self-adjustment of the timing advance by the mobile may include the mobile device calculating and applying an adjustment of the timing advance.

A method similar to the method of FIG. 12 may be performed in a mobile device in some embodiments. In such an embodiment, the mobile device determines a property of a communication channel and configures performance of self-adjustment of the timing advance.

Figure 13:
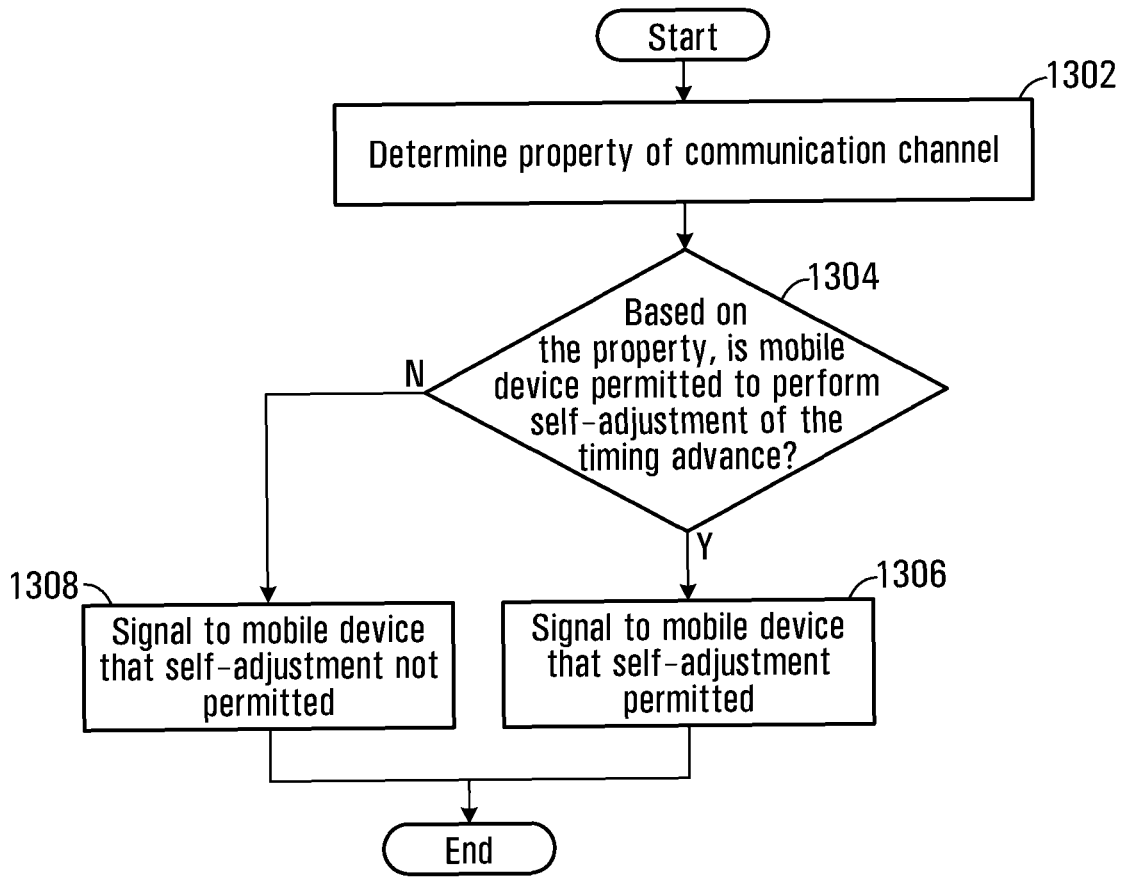
FIG. 13 is a flowchart of a method for a network to control whether a mobile device performs self-adjustment of its timing advance.

FIG. 13 is a flowchart of a specific example of the method of FIG. 12. At block 1302, the network component determines a property of a communication channel. In this example, the communication channel is between the network component and a mobile device. At block 1304, the network component determines, based on the property, whether or not the mobile device is permitted to perform self-adjustment of the timing advance. If the mobile device is permitted to perform self-adjustment (yes path, block 1304), then at block 1306, the network component signals to the mobile device indicating that the mobile device is permitted to perform self-adjustment. If the mobile device is not permitted to perform self-adjustment (no path, block 1304), then at block 1308, the base signals to the mobile device indicating that the mobile device is not permitted to perform self-adjustment. Such timing self-adjustment control signaling may be included in broadcast or dedicated RRC (Radio Resource Control) signaling, for example.

In some embodiments, for example, the property of the communication channel between a network component and a mobile device may include a difference between an uplink propagation time and a downlink propagation time. If the difference between the uplink and downlink propagation times for a mobile device exceeds a threshold, a network component may determine that a mobile device should not perform self-adjustments of the timing advance. As described herein, self-adjustments of the timing advance in some embodiments are, in part, a function of a relative downlink timing change. These calculations assume that the uplink propagation closely correlates to the downlink propagation time. However, if a change in the downlink propagation time does not correlate with a change in the uplink propagation time, the accuracy of self-adjustments of a timing advance by a mobile device may suffer.

Figure 14:
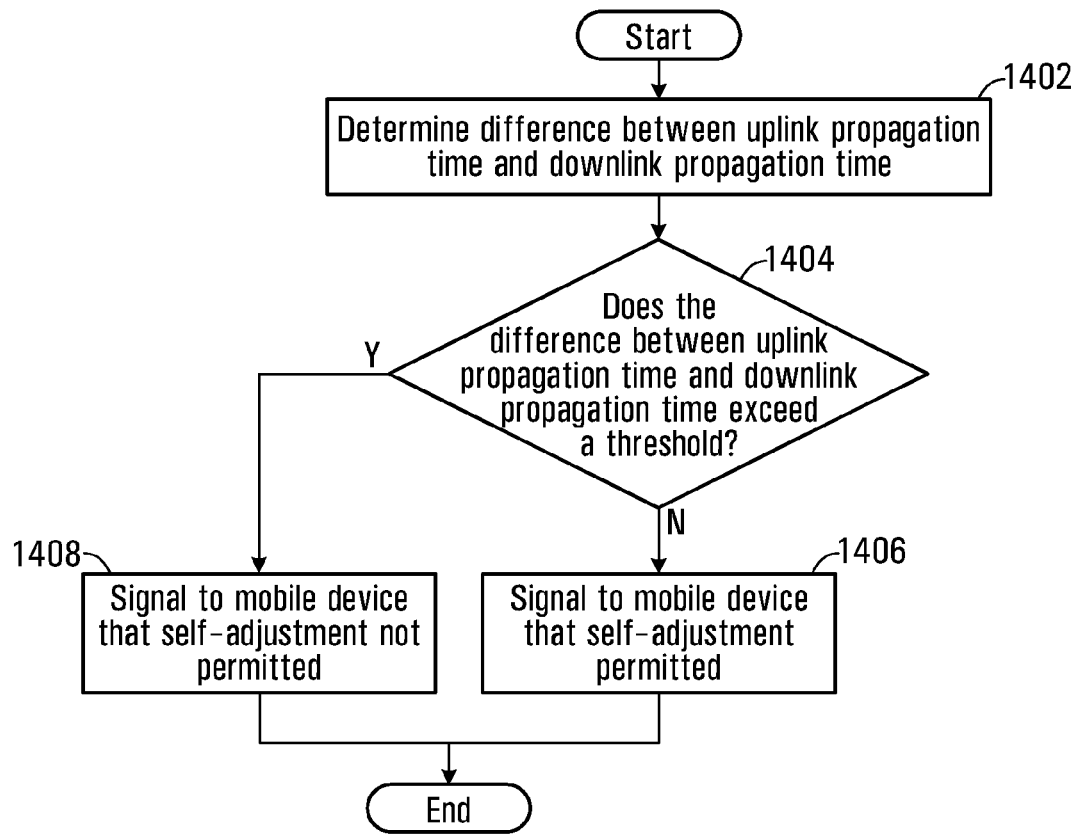
FIG. 14 is a flowchart of another method for a network to control whether a mobile device performs self-adjustment of its timing advance.

FIG. 14 is a flowchart of a method, in a network component, according to some embodiments providing another more detailed example of how self-adjustment of a timing advance by a mobile device may be configured. In FIG. 14, the communication channel property includes a difference between the uplink propagation time and the downlink propagation time. At block 1402, the network component determines the difference between an uplink propagation time and a downlink propagation time between the network component and the mobile device. At block 1404, the network component determines if a difference between the uplink propagation time and the downlink propagation time exceeds a threshold. If the threshold is not exceeded (no path, block 1404), the network component determines that the mobile device is permitted to perform self-adjustment of the timing advance and the method continues in block 1406, in which the network component signals to the mobile device that the mobile device is permitted to perform self-adjustment of the timing advance. If the difference between the uplink propagation time and the downlink propagation time does exceed the threshold (yes path, block 1404), the network component determines that the mobile device is not permitted to perform self-adjustment of the timing advance and at block 1408, the network component signals to the mobile device that the mobile device is not permitted to perform self-adjustment of the timing advance.

A mobile device may also implement a method similar to the method of FIG. 14. For example, if the mobile device can determine either its downlink (or uplink) propagation time, then the mobile device may use this information together with its timing advance to determine its uplink (or downlink) propagation time, assuming that transmission and reception times are synchronized (i.e. co-located in time) at the network component. In such a situation, the timing advance is simply the sum of the downlink and uplink propagation times. Consequently, if any two of these quantities are known, then the third quantity may be calculated. A mobile device may determine the downlink propagation time if the mobile device knew the absolute time at which a downlink transmission was made. The mobile device may then measure the absolute time at which it received the downlink transmission, and the downlink propagation time would simply be the difference between these two times. Absolute times may be measured via GPS (Global Positioning System), for example. In addition, the network component may either broadcast the time at which a particular downlink transmission was made, or a standardized agreement may be made where the network component makes a known downlink transmission at a pre-agreed absolute time.

In a TDD system, the downlink and uplink transmission channels use the same carrier frequency and should therefore have identical propagation characteristics. In FDD systems, there is usually a strong correlation between the downlink and uplink propagation times. The downlink and uplink carrier frequencies are generally not extremely widely separated in frequency, so propagation characteristics as a function of carrier frequency would normally be expected to be similar. Hence, the self-adjustment of the timing advance by a mobile device described herein may be applicable to a majority of FDD deployments as well. Even if there is not an exact (i.e. linear) correlation between the downlink and uplink propagation times in an FDD system, the presence of a reasonable correlation may still aid in the self-adjustment of the uplink timing advance by a mobile device, and may therefore reduce the need for frequent TACs being sent from the network component.

However, there are situations where uplink and downlink propagation times are not well correlated, and a network component may determine not to allow a mobile device to self-adjust its timing advance as a result. An example of a situation where uplink and downlink propagation times may not be well correlated may be a dense urban scenario (e.g. downtown Manhattan) where there are a large number of environmental reflectors that significantly affect the propagation characteristics of both the downlink and uplink signals.

Figure 15:
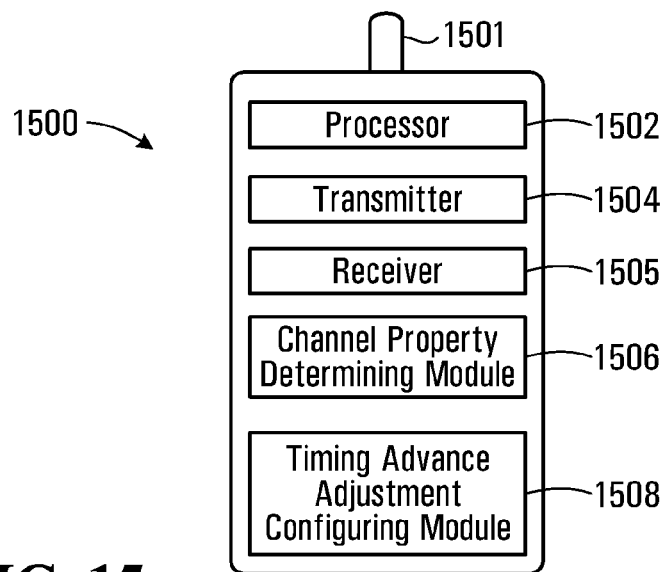
FIG. 15 is a block diagram of a base station that has a timing advance configuring module.

FIG. 15 is a block diagram of an example network component 1500 which may configure performance of self-adjustment of a timing advance by a mobile device, for example in accordance with the method of FIGS. 12 to 14. In FIG. 15, the network component 1500 is an access node. Other methods described herein may be implemented by the access node 1500 in combination with the methods of FIGS. 12 to 14. The access node 1500 comprises at least one antenna 1501, a processor 1502, a transmitter 1504, a receiver 1505, a channel property determining module 1506 and a timing advance adjustment configuring module 1508. The access node 1500 may have other components, such as a component for generating timing advance commands, that are not shown. The transmitter 1504 is configured to transmit downlink signals inclusive of TACs to a mobile device. The channel property determining module 1506 is configured to monitor a property of a communication channel between the access node and the mobile device. In a specific example, the channel property determining module 1506 monitors the difference between uplink and downlink propagation times. The timing advance adjustment configuring module 1508 configures performance of self-adjustment of a timing advance by the mobile device in accordance with one or more of the methods described with reference to FIGS. 12 to 14. The transmitter 1504 is also configured to signal the configuration to the mobile device. The timing advance configuring module 1508 may be implemented as a memory containing instructions for execution by processor 1502, by hardware, or by a combination of instructions stored in a memory and additional hardware, to name a few examples.

In some embodiments, a network component is configured with the ability to transmit a signaling flag, for example as part of broadcast system information, to indicate that mobile devices within the cell shall not perform timing advance self-adjustments and that all such uplink timing advance adjustments shall be under the direct control of the network component. The network component may transmit such a signaling flag if an entire cell represents a "troublesome" scenario for self-adjustment of timing advance. For example, the network component may detect the time of arrival of the uplink signals from all mobile devices in a cell and check the uplink timing change rates. If the uplink timing change rates from most of mobile devices self-adjusting their timing advance are close to or exceed a maximum allowable changing rate, the network component can conclude that the self-adjustment of the timing advance feature does not perform well and it should be disabled.

In some embodiments, a network component is configured with the ability to transmit a signaling flag, for example as part of broadcast system information, that indicates that mobile devices are permitted to perform timing advance self-adjustments. This might be transmitted, for example, in cells where there is a good correlation between the downlink and uplink propagation times. The signaling flag that indicates self-adjustment can be performed and the signaling flag that indicates self-adjustment is not to be performed may be implemented as two separate flags, or as a single field having two values. These flag(s) may, for example, be transmitted in one or two fields within a radio resource control information element.

In some embodiments, a network component may also implement a method for enabling or disabling the use of timing advance self-adjustments by a particular mobile device. For example, the base station may enable or disable self-adjustment of the timing advance through direct control signaling to a mobile device. This may take the form of a dedicated RRC reconfiguration message being sent only to a particular mobile device. This may be useful in cells containing mixed propagation environments. For example, some mobile devices may be in dense urban canyons and should therefore be under control of the base station, while other mobile devices may be in a more open urban area and can therefore perform their own timing advance self-adjustments.

Figure 16:
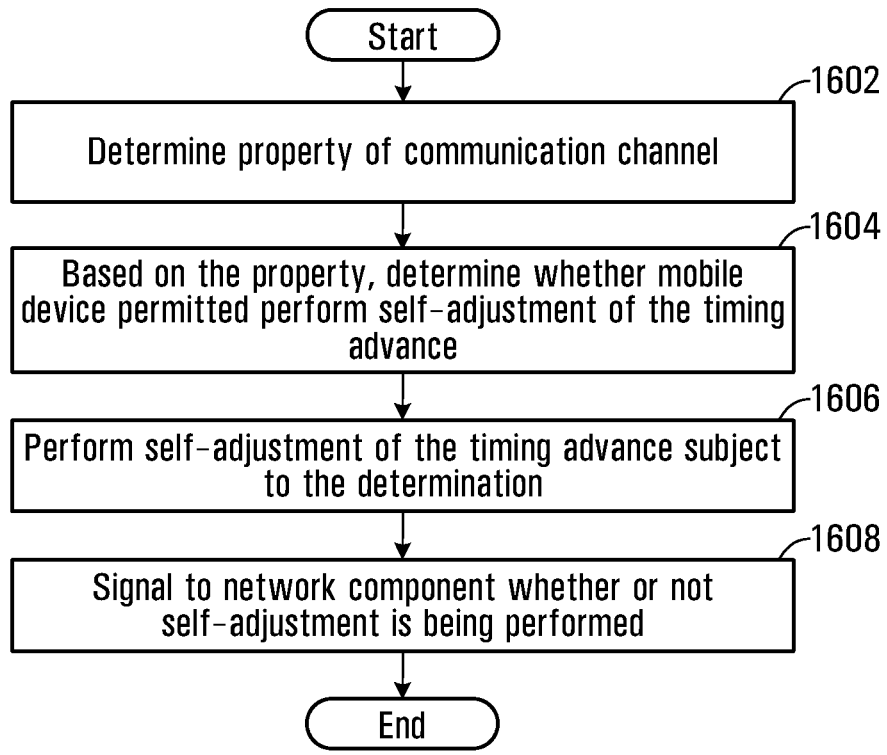
FIG. 16 is a flowchart of a method for a mobile device to control whether self-adjustment of its timing advance is performed.

FIG. 16 is a flowchart of an example of enabling and disabling self-adjustment of timing advance in a mobile device. At block 1602, the mobile device determines a property of a communication channel. In this example, the communication channel is between the mobile device and a network component. As will be discussed below, the property of the communication channel may be the difference between uplink and downlink propagation times, or any other property which may affect the effectiveness of mobile device self-adjustments of the timing advance. At block 1604, the mobile device determines, based on the channel property, whether the mobile device is permitted to perform self-adjustment of the timing advance. At block 1606, the mobile device performs self-adjustment of the timing advance in accordance with the determination from block 1604. At block 1608, the mobile device optionally signals to the network component whether or not it is performing self-adjustments of the timing advance and the method ends.

Figure 17:
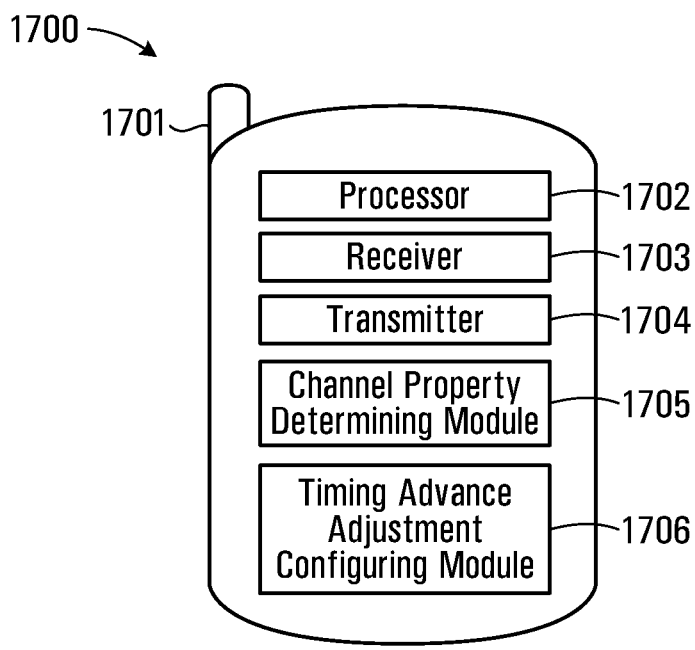
FIG. 17 is a block diagram of a mobile device having a channel property determining module and a timing advance configuring module.

FIG. 17 is a block diagram of an example mobile device 1700 which may configure performance of self-adjustment of a timing advance in accordance with some embodiments described herein. The mobile device 1700 has an antenna 1701, a processor 1702, a receiver 1703, a transmitter 1704, a channel property determining module 1705 and a timing advance adjustment configuring module 1706. The mobile device 1700 may have other components that are not shown. The channel property determining module 1705 is configured to monitor a property of a communication channel between the network component and the mobile device. In a specific example, the channel property determining module 1705 monitors the difference between uplink and downlink propagation times. The timing advance adjustment configuring module 1706 configures performance of self-adjustment of a timing advance, for example in accordance with the method described with reference to FIG. 12 or 16. Other methods described herein may be implemented by the mobile device 1700 in combination with the methods of FIG. 12 or 16. The channel property determining module 1705 and the timing advance adjustment configuring module 1706 may be implemented as a memory containing instructions for execution by processor 1702, by hardware, or by a combination of instructions stored in a memory and additional hardware, to name a few examples.

In one possible embodiment, the channel property determining module 1705 of FIG. 17 estimates the coherence bandwidth and Doppler spread of the downlink channel based on measurements. If the channel coherence bandwidth is large (meaning that the multipath delay spread is small) and the Doppler spread is small (meaning that the mobile speed is low), then it should be safe for the mobile device to use the timing self-adjustment functionality. The characteristics of uplink channels from specific mobile devices may similarly be estimated by a network component and then used to enable or disable timing self-adjustment by particular mobile devices, as shown in blocks 1202 and 1204, respectively, of FIG. 12.

It may be desirable for a mobile device to signal its decision to disable self-adjustment of the timing advance to the network component so that the network component knows that it is now solely responsible for maintaining the mobile device's uplink timing advance. However, embodiments are not so limited and, in some embodiments, a mobile device may not signal that self-adjustment of the timing advance has been enabled or disabled.

In some embodiments, a mobile device that implements the timing advance self-adjustment feature reports its capability to the network, for example upon network entry.

In some embodiments, a mobile device determines its rate for performing timing advance self-adjustments. This may be a function of the mobile device's self-estimated velocity, for example. A mobile device that is stationary or slowly moving may perform timing advance self-adjustments less frequently than a higher velocity mobile device. Where the velocity is determined from channel properties, this can be considered a special case of the method of FIG. 12. A network component may also determine a rate for performing self-adjustments of the timing advance based on an estimated velocity of a mobile device in some embodiments.

In some embodiments, the channel property determined by the network component or mobile device in FIG. 12 is one or more DRX cycle parameters set by the network component. DRX cycle parameters may, for example include a DRX cycle duration, and a DRX on period (Active time). Each DRX cycle thus configured would involve the radio being on for the DRX on period, and being off for the remainder of the DRX cycle duration. The rate and relative timing for the mobile device's timing advance self-adjustments may be implicitly configured via DRX cycle parameter settings. In a specific example, a mobile device is configured to only perform uplink transmissions during the Active Time portion of the DRX cycle. The mobile device is configured to wake up early from its configured DRX cycle, measure the downlink timing, and perform any necessary timing advance self-adjustments. As a result, at the start of the DRX active period, the mobile device will be ready with a more accurately adjusted timing advance.

In some embodiments, the channel property determined by either a network component or a mobile device for the purpose of configuring self-adjustments of a timing advance is a function of the physical environment. For example, if there are a lot of environmental scatterers of radio waves (e.g. downtown NYC), then the network component might want to disable timing self-adjustments. This type of knowledge could be available at the network component.

In some embodiments the mobile device is configured to determine from its own observations whether it cannot properly maintain uplink synchronization or that the interactions between the mobile device's timing advance self-adjustments and the TACs issued by the network component may be causing instability in the mobile device's uplink synchronization. In some scenarios, poor uplink synchronization maintenance or undesirable interactions between the mobile device's timing advance self-adjustments and the TACs issued by the network component may be inferable from the timing of TACs sent to the mobile device from the network component or the size of adjustments to the timing advance dictated by at least one of the TACs or both. A mobile device may be observed to be behaving erratically (i.e. the mobile device is unable to maintain its own uplink synchronization properly). In such scenarios, either the network component or the mobile device may configure the performance of mobile device-oriented self-adjustments to the timing advance based on at least one received TAC. Embodiments in which a network component or mobile device configuring the mobile device's self-adjustment of the timing advance based on TACs received at the mobile device will now be described with reference to FIGS. 18 to 28. The embodiments which will now be described below and with reference to FIGS. 18 to 28 may be implemented in conjunction with, or independently from the embodiments described above.

Figure 18:
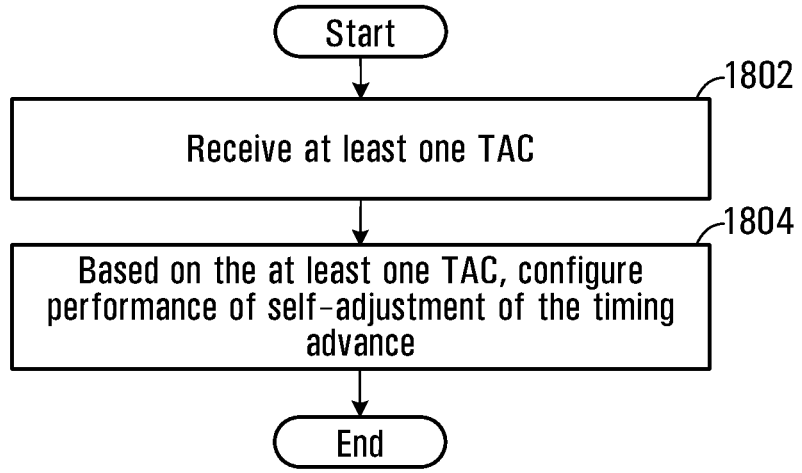
FIG. 18 is a flowchart of a method for a mobile device to configure performance of self-adjustment of its timing advance based on a received timing advance command.

FIG. 18 is a flowchart of a method in a mobile device in accordance with some embodiments for configuring self-adjustments of the timing advance. At block 1802, the mobile device receives at least one TAC indicating an adjustment of a timing advance for the mobile device. At block 1804, the mobile device configures, based on the at least one TAC, performance of self-adjustment of the timing advance and the method ends.

Figure 19:
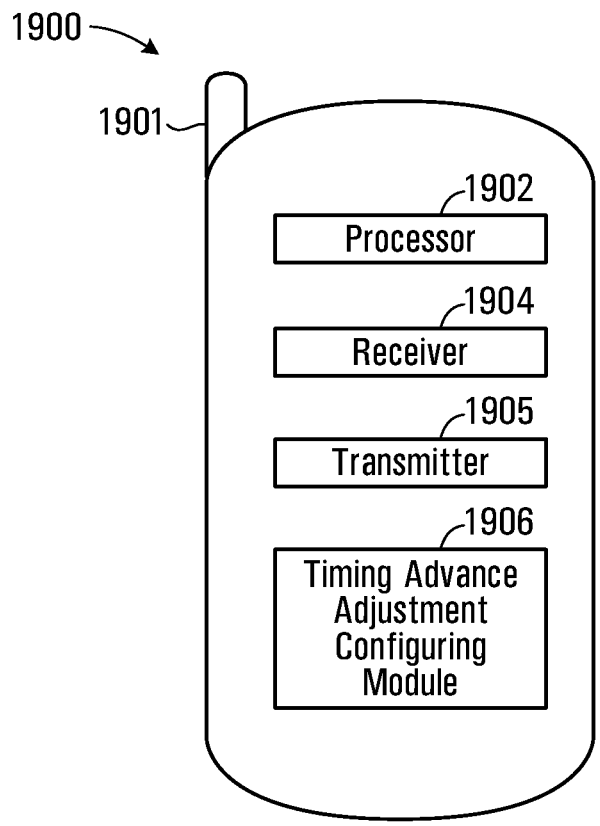
FIG. 19 is a block diagram of a mobile device having a timing advance configuring module.

FIG. 19 is a block diagram of an example mobile device 1900 which may configure performance of self-adjustment of a timing advance by a mobile device in accordance with some embodiments described herein. The mobile device 1900 has at least one antenna 1901, a processor 1902, a receiver 1904, a transmitter 1905, and a timing advance adjustment configuring module 1906. The mobile device 1900 may have other components that are not shown. The receiver 1904 is configured to receive downlink signals inclusive of TACs from a network component. The timing advance adjustment configuring module 1906 configures performance of self-adjustment of a timing advance in accordance with the method described with reference to FIG. 18. The timing advance adjustment configuring module 1906 may be implemented as a memory containing instructions for execution by processor 1902, by hardware, or by a combination of instructions stored in a memory and additional hardware, to name a few examples. The mobile device shown in FIG. 19 may also be configured in some embodiments to perform other methods described herein.

Figure 20:
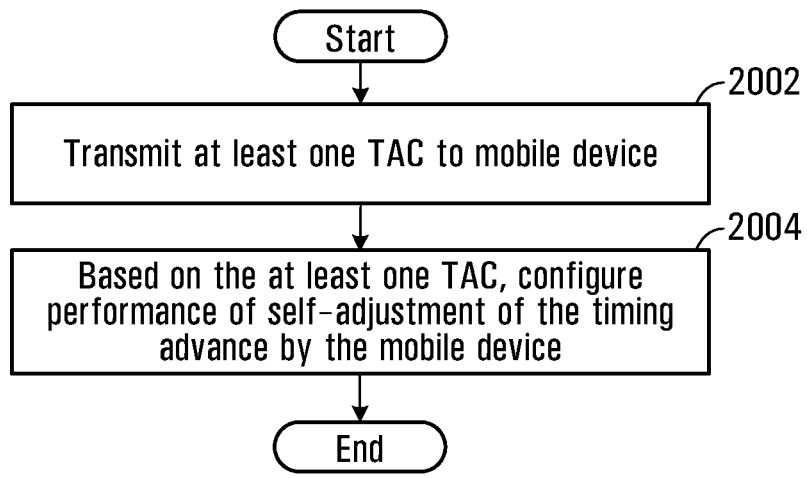
FIG. 20 is a flowchart of a method of configuring a mobile device to perform self-adjustment based on a received timing advance command.

FIG. 20 is a flowchart of a method in a network component according to some embodiments. At block 2002, the network component transmits at least one TAC to a mobile device. At block 2004, the network component configures, based on the at least one TAC, performance of self-adjustment of the timing advance by the mobile device and the method ends.

Figure 21:
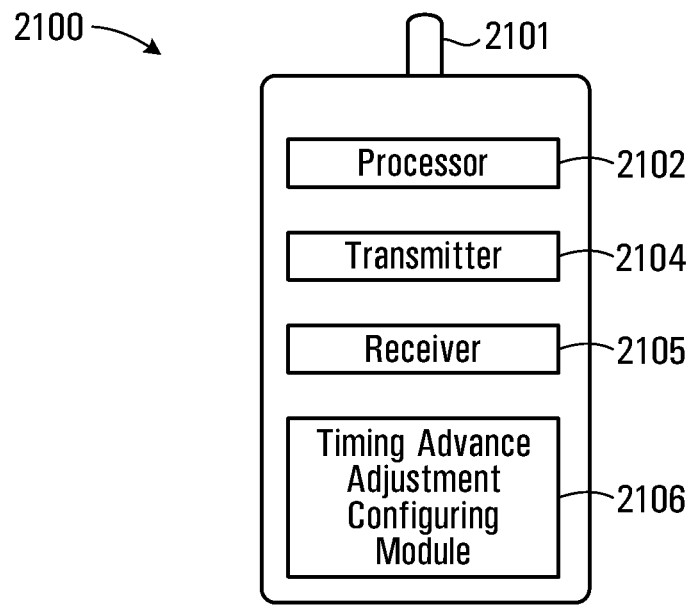
FIG. 21 is a block diagram of a base station having a timing advance configuring module.

FIG. 21 is a block diagram of an example network component 2100 which may configure performance of self-adjustment of a timing advance by a mobile device in accordance with some embodiments described herein. The network component 2100 in FIG. 21 is an access node. The access node 2100 has at least one antenna 2101, a processor 2102, a transmitter 2104, a receiver 2105, and a timing advance adjustment configuring module 2106. The access node 2100 may have other components that are not shown. The transmitter 2104 is configured to transmit downlink signals inclusive of TACs to a mobile device. The timing advance adjustment configuring module 2106 configures performance of self-adjustment of a timing advance by the mobile device in accordance with the method described with reference to FIG. 20. The transmitter 2104 is also configured to signal the configuration to the mobile device. The timing advance configuring module 2106 may be implemented as a memory containing instructions for execution by processor 2102, by hardware, or by a combination of instructions stored in a memory and additional hardware, to name a few examples. The access node shown in FIG. 21 may also be configured in some embodiments to perform other methods described herein.

There may be scenarios (e.g. dense urban cells) where interactions between a mobile device's timing advance self-adjustments and the TACs issued by a network component cause unstable oscillations in the mobile device's uplink timing advance or uplink synchronization or both. This situation is undesirable, and may be recognized by the network component or the mobile device or both. For example, a network component or a mobile device may determine that the mobile device should not be permitted to perform self-adjustments of the timing advance if one or more of the following situations is observed:

a) the network component is issuing TACs to a mobile device more frequently than a specified threshold;

b) the network component is issuing one or more TACs to a mobile device with timing advance adjustments whose magnitudes are larger than a specified threshold;

c) the TACs received from the network component contain large timing adjustments (which would be an indication that the mobile device is not autonomously maintaining its uplink synchronization very well);

d) the TACs issued by the network component are received by a mobile device at a similar rate to which the mobile device is making its own timing advance self-adjustments;

e) the TACs received from the network component generally countermand the timing advance self-adjustments made by the mobile device (e.g. having opposite signs and having magnitudes that exceed a threshold).

The mobile device may be configured to unilaterally disable self-adjustment of the timing advance if one or more of these situations is observed. Alternatively, the network component may signal to the mobile device that it should disable such functionality upon detection of such a scenario. The five scenarios described above are specific examples; the mobile device and or the network component may be configured to look for one or more of these scenarios but a similar behavior may be implemented based upon other scenarios not specifically presented.

Figure 22:
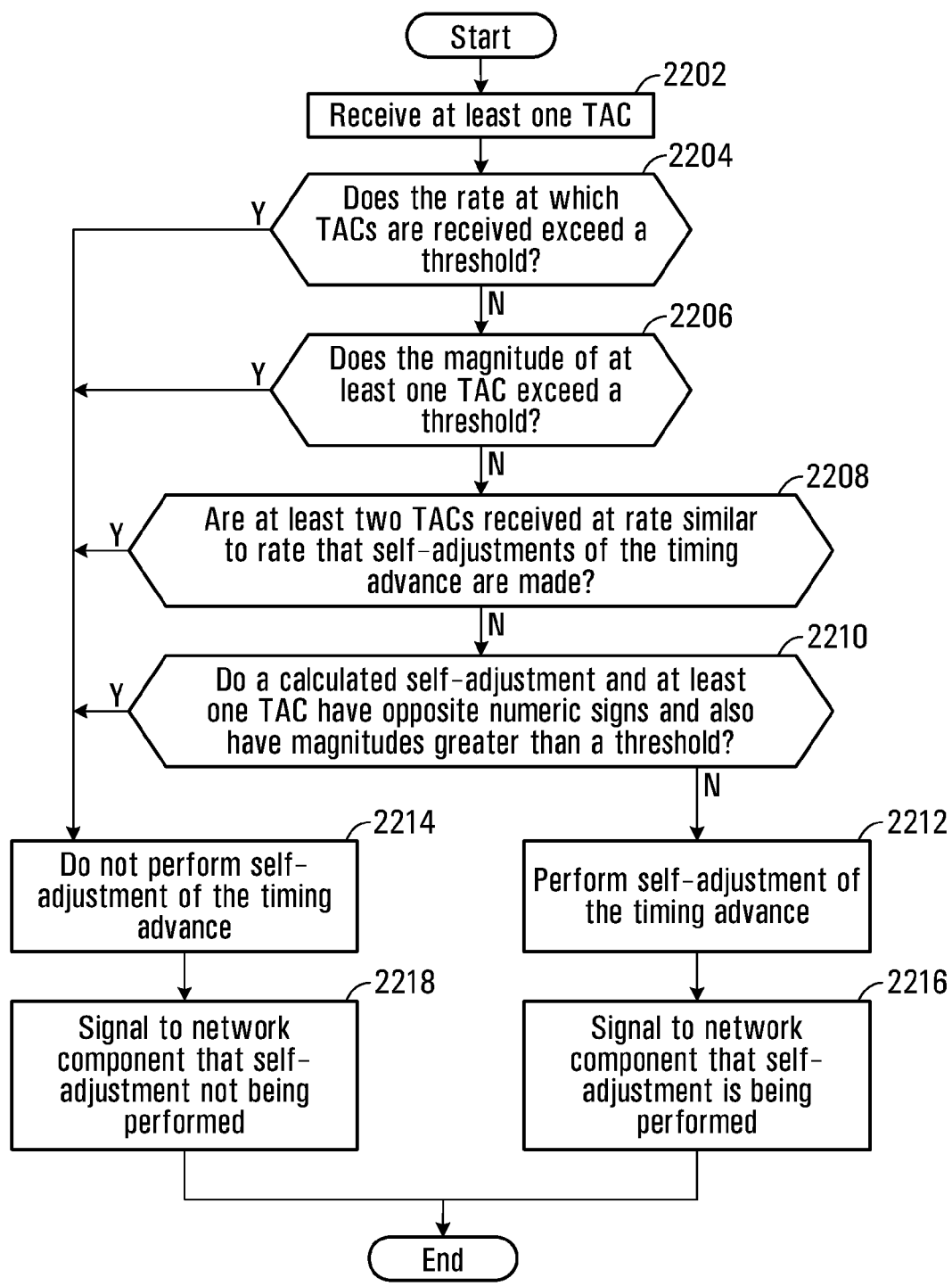
FIG. 22 is a flowchart of a method for a mobile device to control whether self-adjustment of its timing advance is performed as a function of received timing advance commands.

FIG. 22 is a flowchart of a method in a mobile device according to some embodiments in which the mobile device may autonomously disable self-adjustments of the timing advance. At block 2202, the mobile device receives at least one TAC. At blocks 2204 to 2210, the mobile device determines, based on the at least one TAC, whether it is permitted to perform self-adjustments of the timing advance. Specifically, at block 2204, the mobile device determines if the rate at which two or more TACs are received exceeds a threshold. At block 2206, the mobile device determines if the magnitude of a value indicated by the at least one TAC exceeds a threshold, the value indicated by the at least one TAC indicating an adjustment of the timing advance. At block 2208, the mobile device determines if two or more TACs are received at a similar rate to the rate that self-adjustments of the timing advance are made. At block 2210, the mobile device determines if a calculated self-adjustment and the value indicated by the at least one TAC have opposite numeric signs and magnitudes which each exceed a threshold. If none of the potentially problematic scenarios of blocks 2204 to 2210 have been observed (no path for all of blocks 2204, 2206, 2208, 2210), the mobile device determines at block 2212 that it is permitted to perform self-adjustment of the timing advance and performs such self-adjustment. At block 2216, the mobile device signals to the network component that self-adjustments are being performed and the method ends. Conversely, if one of the problematic situations is observed, (yes path for any of blocks 2204, 2206, 2208, 2210) then at block 2214, the mobile device does not perform self-adjustments of the timing advance, and at block 2218, the mobile device signals the network component that self-adjustments are not being performed and the method ends.

In some embodiments, only one, or a combination of blocks 2204, 2206, 2208, 2210 is implemented. Other scenarios are also contemplated. One skilled in the art will appreciate that methods in some embodiments are not limited to those in which each of the possible determinations of blocks 2204 to 2210 are performed. One or more of these factors may not be an appropriate measure of whether self-adjustment of the timing advance is effective in some scenarios. Some embodiments may use less or more factors to determine whether a mobile device is permitted to self-adjust its timing advance. It is also to be understood that a network component may make similar observations and determine whether a mobile device is permitted to self-adjust its timing advance using a method similar to that described with reference to FIG. 22. A network component would signal to the mobile device whether self-adjustment of the timing advance is permitted.

In addition to recognizing that a problematic interaction between network component-originated and mobile device-originated uplink timing advance adjustments exists, it is, of course, desirable to avoid such a problem arising in the first place. Methods and devices described with reference to FIGS. 4 to 11C may help prevent such problems from arising. In some embodiments, other configurations of mobile device self-adjustment may be utilized together with, or independently from those described with reference to FIGS. 4 to 11C. For example, a timing parameter according to which a mobile device is permitted to check the downlink timing and determine if a timing advance self-adjustment needs to be made (i.e. perform self-adjustments of the timing advance) may be configured either explicitly or implicitly. A timing parameter can include specific times or a rate or both at which self-adjustments may be performed by a mobile device. Examples of such configuration approaches are listed below, but are not limited to the possibilities given here.

Figure 23:
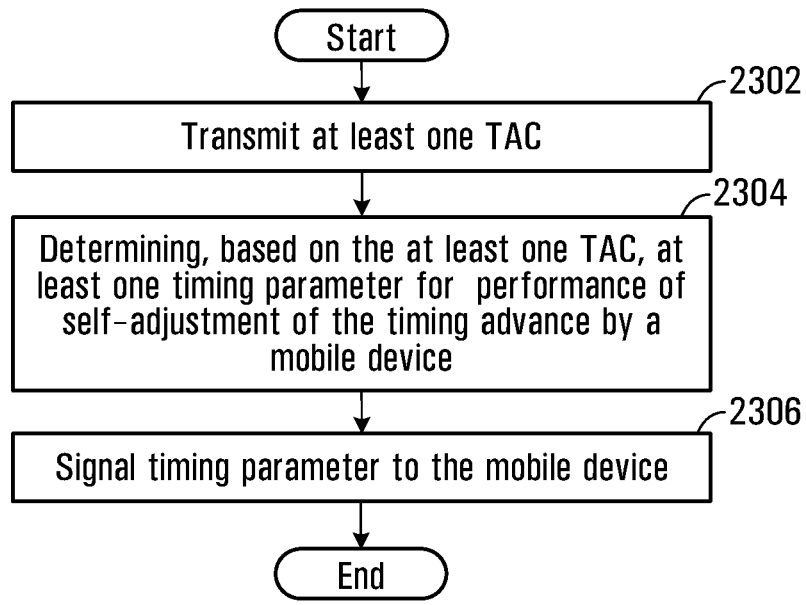
FIG. 23 is a flowchart of a method for a network to control the timing of self-adjustments of a timing advance performed by a mobile device.

FIG. 23 is a flowchart of a method in some embodiments for configuring a timing parameter for a mobile device which is permitted to perform self-adjustments of the timing advance. The network component shown in FIG. 21 may perform such a method in some embodiments. At block 2302, the network component transmits at least one TAC to a mobile device. At block 2304, the network component determines, based on the at least one TAC, at least one timing parameter subject to which performance of self-adjustment of the timing advance by the mobile device is permitted. At block 2306, the network component signals the at least one timing parameter to the mobile device and the method ends. It is to be understood that a similar method may be performed in a mobile device (such as the mobile device shown in FIG. 19) which receives, rather than transmits, the at least one TAC. A mobile device would also perform timing advance self-adjustments subject to the timing parameter and may further signal the at least one timing parameter to the network component.

In some embodiments, a network component may explicitly configure a mobile device to autonomously update its uplink timing advance at a certain rate and possibly with a certain timing offset (e.g. every certain number of subframes, beginning at a certain subframe; where a subframe is a basic time unit of transmission, such as 1 ms in E-UTRA). In some embodiments, this may be a cell-wide configuration broadcast through the system information, or a mobile device-specific configuration signaled directly to the mobile device. For example, by instructing a mobile device to perform timing advance self-adjustments at a certain rate and with a certain timing offset, the network component may be able to position the calculation and signaling of its own signaled TACs between two mobile device timing advance self-adjustments, in order to reduce any potential interaction between the different uplink timing advance adjustments.

Figure 24:
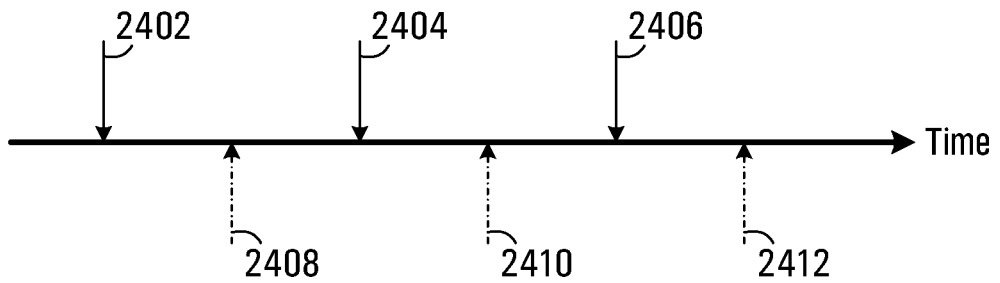
FIG. 24 is a diagram illustrating an example of time points for timing advance self-adjustment.

FIG. 24 is a diagram illustrating an example of how timing of self-adjustments of the timing advance by a mobile device may be configured to not interfere with TACs from a network component. In FIG. 24, the mobile device is configured to perform any necessary uplink timing advance adjustments (e.g. by following the procedure described earlier in FIG. 17) at the time points shown by the solid down-pointing arrows indicated by reference characters 2402, 2404 and 2406 in FIG. 24. Meanwhile, the network component calculates and transmits any necessary uplink timing advance adjustments by means of TACs at the time points shown by the stippled up-pointing arrows indicated by reference characters 2408, 2410 and 2412. The timing of the self-adjustments 2402, 2404 and 2406 may be configured such that there is sufficient time between any TAC time point 2408, 2410 or 2412 and the following mobile device self-adjustment time 2402, 2404 or 2406 point to allow for the necessary downlink transmission of the TAC, including any required Hybrid Automatic Repeat reQuest (HARQ) retransmissions of the Medium Access Control (MAC) Protocol Data Unit (PDU) containing the TAC. In some embodiments, the network component may not need to actually transmit an uplink timing advance adjustment at each of its time points—application of some of the proposed methods may reduce the number of network component-originated uplink TACs that the network component needs to transmit.

In some embodiments, if a TAC is received from the network component, then the mobile device applies that timing advance adjustment and disregards any timing advance self-adjustment that the mobile device recently calculated. This may help to avoid any undesirable interactions between the network component and the mobile device simultaneously calculating timing advance adjustments. If this occurs, the mobile device may undesirably apply a timing advance self-adjustment that is too large (e.g. equal to the sum of the timing advance adjustments determined by both the network component and mobile device, when in fact only one of these two timing adjustments would be required).

Figure 25:
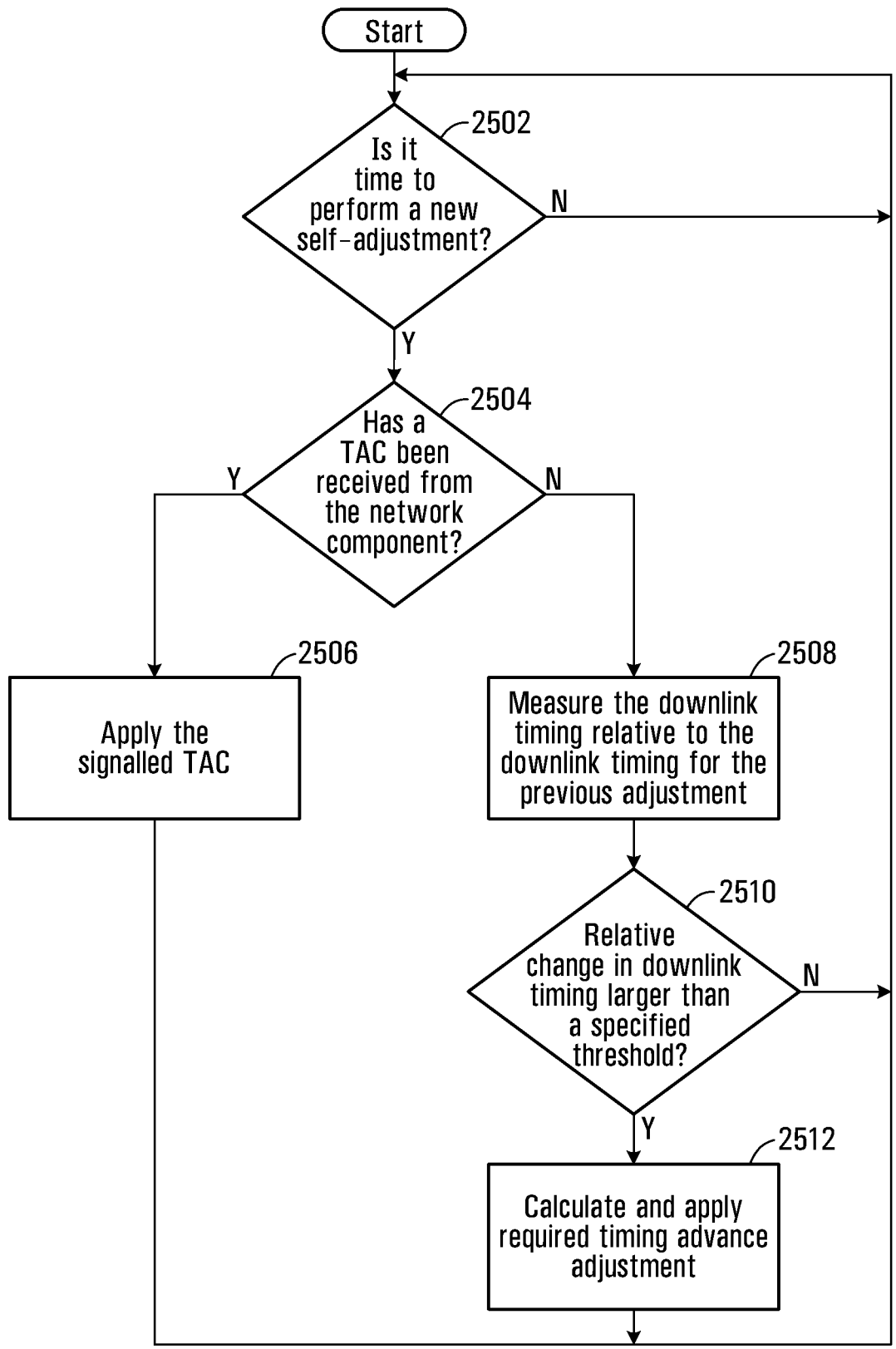
FIG. 25 is a flowchart of a method for a mobile device to adjust its timing advance based on whether a timing advance command has been received.

In some embodiments, before calculating a self-adjustment of a timing advance, a mobile device first determines whether a TAC has been recently received. FIG. 25 is a flowchart of a method for a mobile device to make such a determination. At block 2502, the mobile device determines whether it is time to perform a self-adjustment of the timing advance. If it is not time to perform a self-adjustment of the timing advance (no path, block 2502), then the method repeats the process of block 2502. If it is time to perform a self-adjustment (yes path, block 2502), then at block 2504 the mobile device checks to see if it has recently received a TAC from the network component. If a TAC has been received (yes path, block 2504), then the method proceeds to block 2506. If a TAC has not been received (no path, block 2504), then the method proceeds to block 2508. At block 2506, the mobile device applies the network component-originated uplink timing advance adjustment (contained in the TAC) and does not conduct its own self-adjustment of the timing advance. At blocks 2508 to 2512, the mobile device follows a procedure for determining and applying a mobile device-originated uplink timing advance adjustment that was described earlier with reference to FIG. 3. In this example, at block 2508, the mobile device measures the relative downlink timing change with respect to the downlink timing at the previous adjustment performed by the mobile device. At block 2510, the mobile device determines whether the relative downlink timing change is larger than a specified threshold. If the relative downlink timing change is larger than a specified threshold (yes path, block 2510), then at block 2512 the mobile device calculates and applies an adjustment of the timing advance. This self-adjustment may be calculated in some embodiments according to methods described herein. If the relative downlink timing change is not larger than a specified threshold (no path, block 2510), then the method proceeds back to block 2502.

In another embodiment, to possibly address the problem of potential interactions between network component-originated and mobile device-originated uplink timing advance adjustments, the mobile device is configured to determine more accurately when a network component-originated timing adjustment was originally signaled in a TAC. For example, in some embodiments, a TAC may be contained within a MAC PDU as a MAC control element. However, the physical layer transport block containing this MAC PDU may undergo HARQ retransmissions on the downlink (if it cannot be correctly decoded by the mobile device) and may therefore be delayed in time before the mobile device MAC layer actually receives the MAC PDU.

In E-UTRA, downlink transmissions on the Physical Downlink Shared CHannel (PDSCH) are described by Downlink Control Information (DCIs) on the Physical Downlink Control CHannel (PDCCH). One of the fields within these DCIs is the New Data Indicator (NDI) flag. If this flag is toggled from its previous value for the indicated DL HARQ process, then a new data transmission is being signaled. Conversely, if the NDI flag maintains the same value as before for the indicated DL HARQ process, then the current transmission represents an HARQ retransmission. The mobile device can thus easily determine when the first transmission attempt for a particular physical layer transport block/MAC PDU was made.

Figure 26:
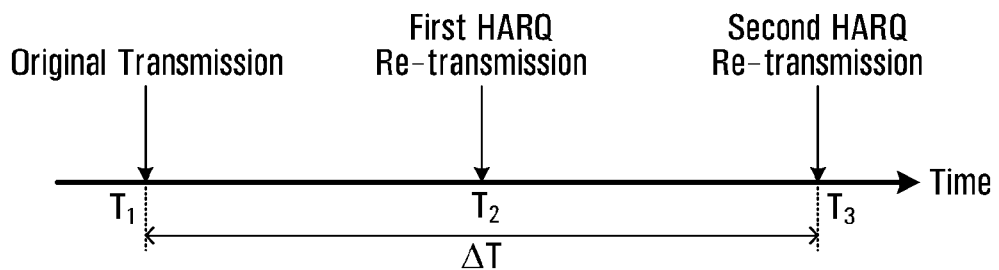
FIG. 26 is a diagram illustrating transmission of timing advance commands.
Figure 27:
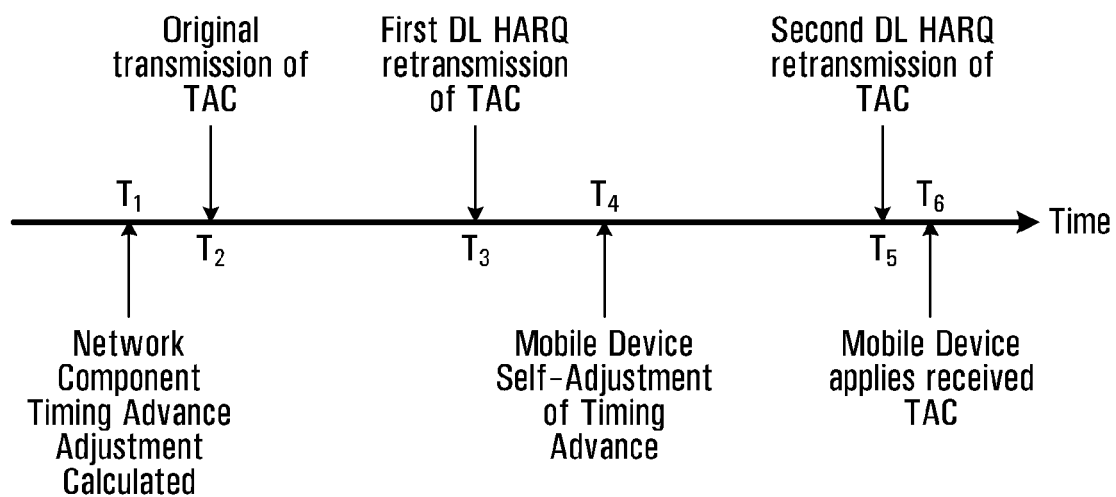
FIG. 27 is another diagram illustrating transmission of timing advance commands.

FIG. 26 is a diagram illustrating an example of a HARQ retransmission procedure wherein a TAC is retransmitted to a mobile device. At a first time $T_1$, an original transmission containing a TAC is transmitted from a network component to a mobile device. At $T_1$, the NDI flag for the transmission to a particular DL HARQ process is toggled, thereby indicating that a new data transmission is being made to that DL HARQ process. However, in this example, the original transmission and first DL HARQ retransmission of the transport block cannot be successfully decoded. Therefore, at a second time $T_2$, a first HARQ retransmission re-sends the TAC to the mobile device. In this example, the mobile device is again unable to decode the retransmission. The NDI flag is not toggled, thereby indicating that the transmission is a HARQ retransmission. At a third time $T_3$, a second HARQ retransmission re-sends the TAC to the mobile device. The NDI flag is still not toggled, thereby indicating that the transmission is another HARQ retransmission. In this example, the mobile device successfully decodes the transport block upon reception of the second downlink HARQ retransmission. When the mobile device physical layer provides the decoded transport block (MAC PDU) to the mobile device MAC layer, the mobile device physical layer can also provide the original time of the first transmission of that transport block (or equivalently, the amount of elapsed time since the original new data transmission).

The knowledge of the time of the first transmission of a TAC allows the mobile device to determine if there was a "collision" between a network component-originated timing adjustment and a mobile device-originated timing adjustment. An example of such a collision is shown below in FIG. 27. As in FIG. 26, the original new data transmission of the MAC PDU containing the network component-originating timing adjustment (i.e. the TAC) and the subsequent two downlink HARQ retransmissions of that same MAC PDU are transmitted to the mobile device. In this example, these transmissions are sent at $T_2$, $T_3$, and $T_5$, respectively. The original measurement for the network component-originated timing adjustment occurred at time $T_1$. However, the mobile device also calculated its own mobile device-originated timing adjustment at time $T_4$, which occurs between the time when the network component determined its own network component-originated timing adjustment ($T_1$) and the time where this network component-originated timing adjustment is applied ($T_6$). If both the network component-oriented adjustment contained in the TAC and the self-adjustment of the timing advance calculated by the mobile device are applied by the mobile device, then the mobile device's uplink timing advance will have been modified by too large an amount. The mobile device is configured to recognize that this situation has occurred and to "back out" of its own recent mobile device-originated timing adjustment. A sample procedure for accomplishing this according to some embodiments is described below with reference to FIG. 28.

Figure 28:
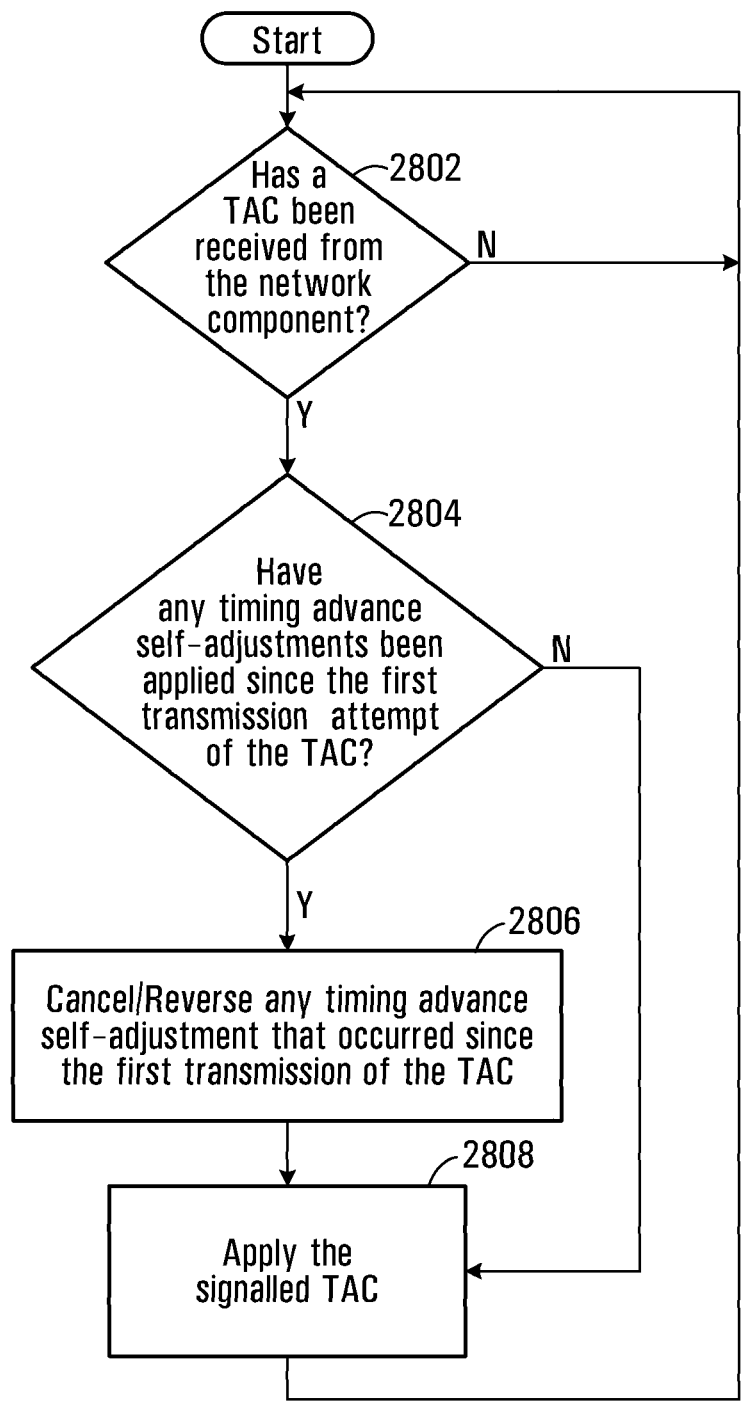
FIG. 28 is a flowchart of a method for a mobile device to adjust its timing advance after a timing advance command is received.

FIG. 28 is a flowchart of a method for a mobile device to adjust its timing advance after a timing advance is received. At block 2802, the mobile device determines whether a TAC has been received from a network component. If a TAC has been received (yes path, block 2802), the method proceeds to block 2804. If a TAC has not been received (no path, block 2802), the method repeats the process of block 2802. At block 2804, the mobile device determines whether it has applied any self-adjustments of the timing advance since the first/original transmission attempt of the TAC. If one or more self-adjustments have been applied since the first/original transmission attempt of the TAC (yes path, block 2804), then at block 2806 the mobile device cancels or reverses any self-adjustments of the timing advance which were calculated since the first/original transmission of the TAC. The method then proceeds to block 2808. If no self-adjustments have been applied since the first/original transmission attempt of the TAC (yes path, block 2804), the method simply proceeds to block 2808. At block 2808, the mobile device applies the received TAC.

The methods, apparatuses, and computer readable media described herein may allow longer DRX cycles may be used for RRC_CONNECTED mobile devices that are currently "idle" (i.e. no data traffic). Specifically, a mobile device which is performing self-adjustments of the timing advance may require fewer timing advance corrections in the form of TACs sent from a network component. Therefore, the mobile device would not have to "wake up" from "idle" mode as often. This may result in less receiver processing (and power consumption) being required over a given period of time. In an example embodiment, upon determining that a mobile device is permitted to perform self-adjustments of the timing advance, or upon receipt of a signal indicating that a mobile device is performing self-adjustments, a network component may configure that mobile device's DRX cycle to be longer with respect to the DRX cycle of a mobile device which cannot or is not performing such self-adjustments. Conversely, upon determining that a mobile device is not permitted to perform self-adjustments of the timing advance, or upon receipt of a signal indicating that a mobile device is not performing self-adjustments, a network component may configure that mobile device's DRX cycle to be shorter with respect to the DRX cycle of a mobile device which can or is performing such self-adjustments.

Figure 29:
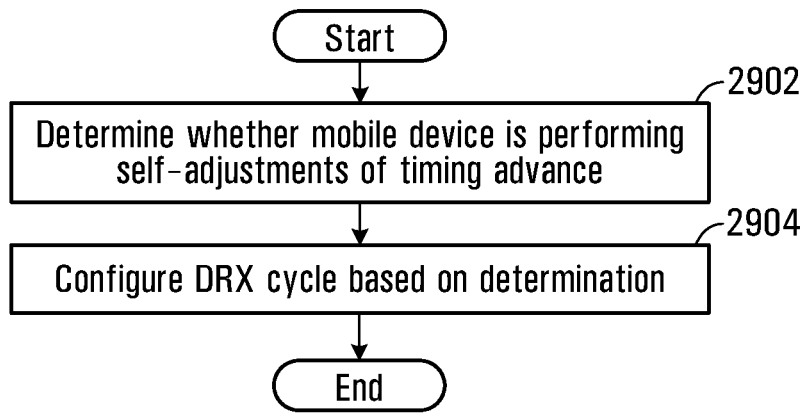
FIG. 29 is a flowchart of a method of configuring a DRX cycle based on a determination of whether a mobile device is performing self-adjustments to its timing advance.

FIG. 29 is an example method in a network component for configuring the DRX cycle. At block 2902, the network component determines whether a mobile device is performing self-adjustment of its timing advance. This determination may simply comprise ascertaining whether a mobile device is capable of performing such self-adjustments or permitted to perform such self-adjustments or both. At block 2904, the network component configures the DRX cycle based on the determination of block 2902 and the method ends.

In order to determine the appropriate timing advance adjustments to issue to each mobile device, the network component must be able to measure transmitted uplink signals from each mobile device and then determine how the relative timing has changed. This measurement process at the network component requires some form of transmission from the mobile device. A mobile device that is relatively idle in a traffic sense (i.e. has no data to transmit) but which is still connected to the network and therefore considered to be active, may not be performing such uplink transmissions. It may therefore be necessary for such a mobile to make periodic SRS (Sounding Reference Signals) transmissions on the uplink which that allow the network component to measure the mobile device's uplink transmission timing. A network component may not have to calculate adjustments of the timing advance for a mobile device as often if the mobile device can perform self-adjustments of the timing advance as described herein. Thus, the embodiments described herein may result in longer intervals between SRS sounding transmissions on the uplink, thereby reducing the total transmission power used by the mobile device.

When a mobile device first connects to a network or to a new network component, the mobile device does not have uplink synchronization. Consequently, one of the tasks involved in network entry is obtaining uplink synchronization with the target network component so that interference to uplink transmissions from other already-connected mobile devices is minimized. For example, a random access procedure may be used for initial synchronization in some embodiments. After a mobile device has initially obtained uplink synchronization with the network component, it is then necessary to maintain this uplink synchronization. Each active mobile device that is connected to an access node is configured with a time alignment timer. This timer is reset whenever a new TAC is received from the network component. However, if the timer expires, then the mobile device must consider itself to have lost uplink synchronization and must re-obtain uplink synchronization (i.e. perform the random access procedure). The time alignment timer setting may be a mobile device specific or cell wide parameter. In E-UTRA, the time alignment timer information element can be either obtained from the timeAlignmentTimerCommon field of SystemInformationBlockType2 (i.e. SIB2) or from the timeAlignmentTimerDedicated field of the MAC-MainConfiguration information element (in Sec.6.3.2 Radio resource control information elements of TS36.331 http://www.3gpp.org/ftp/Specs/html-info/36331.htm).

Figure 30:
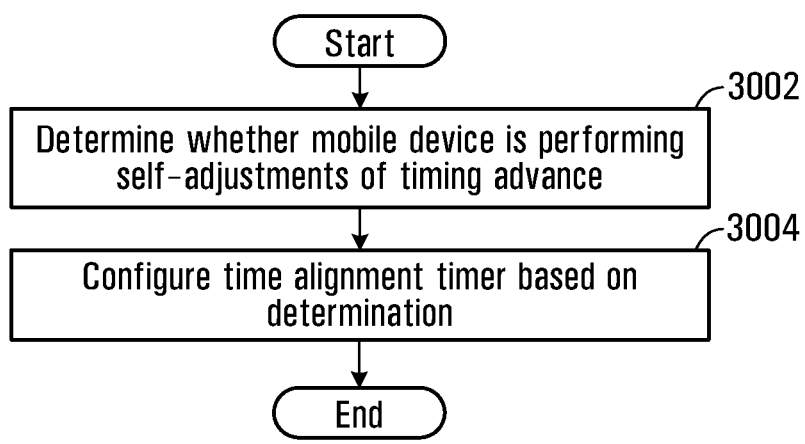
FIG. 30 is a flowchart of a method of configuring a time alignment timer based on a determination of whether a mobile device is performing self-adjustments to its timing advance.

FIG. 30 is an example method for configuring a time alignment timer. At block 3002, the network component determines whether a mobile device is performing self-adjustment of its timing advance. This determination may simply comprise ascertaining whether a mobile device is capable of performing such self-adjustments or permitted to perform such self-adjustments or both. At block 3004, the network component configures the time alignment timer based on the determination of block 3002 and the method ends. A mobile device may perform a similar method.

In some embodiments, if a mobile device is performing self-adjustments of the timing advance, the time alignment timer may be set with a larger expiry time, so that a mobile device can assume that it has uplink synchronization for a longer period of time without the need for TACs to be transmitted by the network component. Even if such a TAC is not actually required, it may still be necessary for the network component to transmit such a command in order to restart the mobile device's time alignment timer and thus prevent this timer from undesirably expiring. Adjustments of the time alignment timer may be made either by explicit control signaling from the network component or autonomously by the mobile device.

In addition, a mobile device which is capable of performing self-adjustments of its timing advance may be able to more easily maintain uplink synchronization while in the RRC_CONNECTED state. This capability reduces additional latency that would otherwise be incurred if a mobile device had to perform a random access procedure in order to regain uplink synchronization.

The possible advantages of a mobile device self-adjusting its timing advance may result in reducing the total power usage by a handheld mobile device, thereby increasing battery life.

From a network component's viewpoint, performance by a mobile device of self-adjustment of the mobile device's timing advance may provide reduced control signaling overhead involved with the transmission of TACs, since these commands do not need to be sent as often. A processing load at the network component may also be reduced since network component-originated TACs may not need to be calculated and transmitted to mobile devices as frequently. In addition, there may be a need for fewer SRS transmissions from mobile devices within the cell which can lead to reduced uplink interference, thereby making it easier to decode uplink transmissions from mobile devices.

According to some embodiments, a computer readable medium may have computer executable instructions stored thereon that, when executed by a computer, cause the computer to implement one or a combination of two or more of the methods described herein. It will be apparent to one skilled in the art that computer readable mediums can take many forms, and embodiments are not limited to any specific form of medium provided that the medium is readable by a computer (for example, a computer processor in a network component or a mobile device).

It is to be understood that a combination of more than one of the above approaches may be implemented in some embodiments. Embodiments are not limited to any particular one or more of the approaches, methods or apparatuses disclosed herein.

Figure 31:
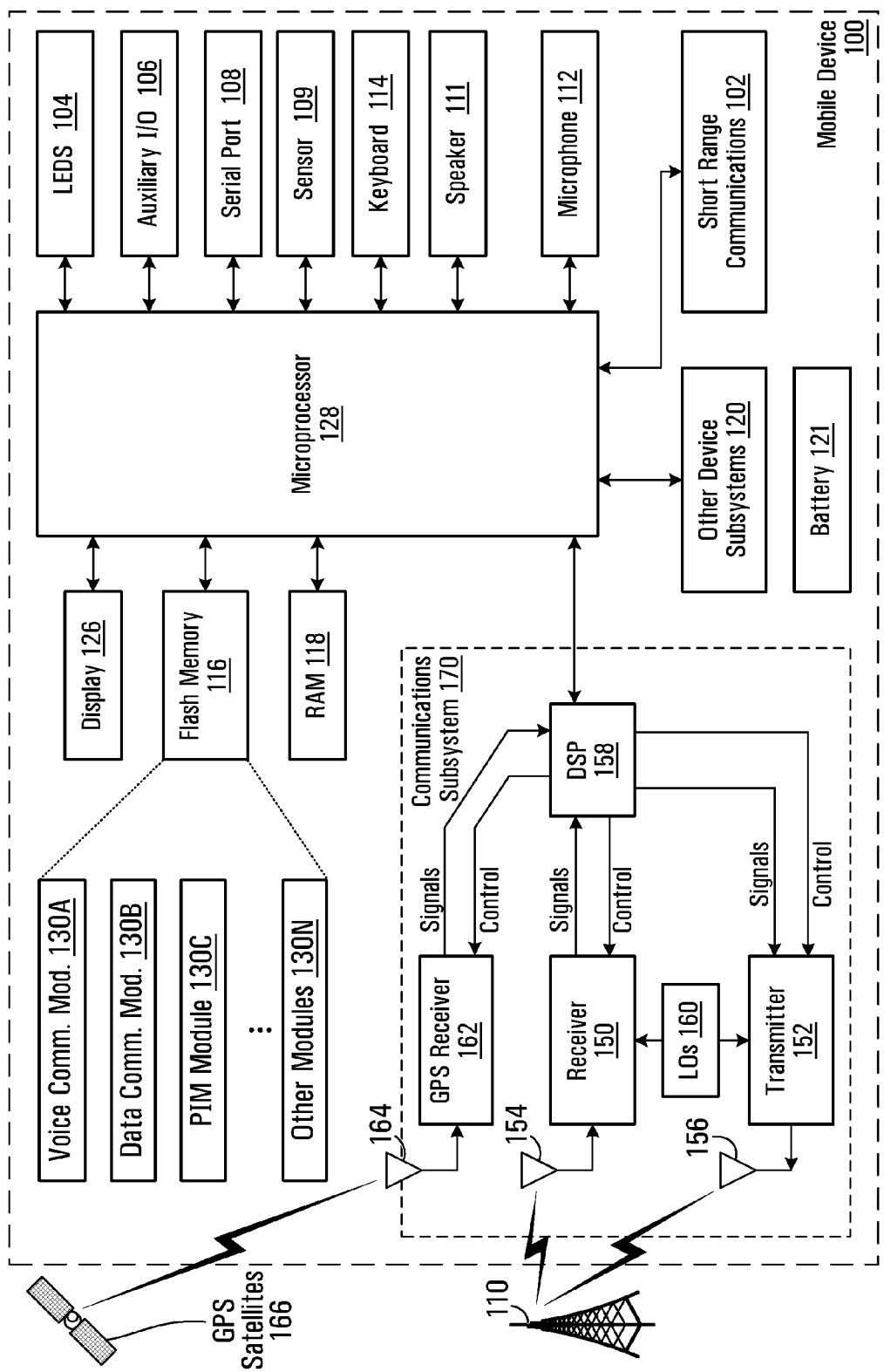
FIG. 31 is a figure of yet another mobile device.

Referring now to FIG. 31, shown is a block diagram of another mobile device 100 that may implement any of the device methods described herein. The mobile device 100 is shown with specific components for implementing features similar to those of the mobile devices 500, 1700, and 1900 shown in FIGS. 5, 17, and 19 respectively. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processor 502, 1702 and 1902 of the mobile devices shown in FIGS. 5, 17 and 19 respectively. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules can for example include timing advance adjustor of the mobile device 500 shown in FIG. 5. Additionally, the software modules can include timing advance configuring modules 1706, 1906 of the mobile devices 1700, 1900 shown in FIGS. 17 and 19. Further software modules can include the channel property determining module 1705 of FIG. 17. Note that the implementations described with reference to FIG. 10 are very specific for exemplary purposes. For example, alternative implementations are possible in which the information updater is not implemented as software and stored on the flash memory 116.

More generally, the information updater may be implemented as software, hardware, firmware, or any appropriate combination thereof.

Communication functions, including data and voice communications, are performed through the communications subsystem 170, and possibly through the short-range communications subsystem 102. The communications subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The receiver 150 and transmitter 152 may be similar to the receivers 504,1703, 1904 and transmitters 505,1704,1905 of FIGS. 5, 17 and 19. The communications subsystem 170 has features similar to the downlink timing monitor 506 of FIG. 5.

The specific design and implementation of the communications subsystem 170 is dependent upon the communication network in which the mobile device 100 is intended to operate. For example, the communications subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using at least one of the keyboard 114 and some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

What has been described is merely illustrative of the application of the principles of the disclosure. Other arrangements and methods can be implemented by those skilled in the art without departing from the spirit and scope of the present disclosure.

The invention claimed is:

1. A method in a mobile device, the method comprising:
calculating, at the mobile device, an adjustment of a timing advance toward a target timing advance in accordance with an adjustment parameter, the adjustment parameter comprising at least one of an adjustment step size and an adjustment time interval,
the target timing advance being a function of a relative downlink timing change,
the timing advance indicating uplink transmission timing relative to downlink reception timing in the mobile device; and
upon receipt of a timing advance command, adjusting, at the mobile device, the adjustment parameter based on the timing advance command and at least one of:
a difference between the target timing advance and the timing advance; and
the adjustment of the timing advance.

2. The method of claim 1, wherein adjusting the adjustment parameter based on the timing advance command and at least one of: a difference between the target timing advance and the timing advance; and the adjustment of the timing advance comprises adjusting the adjustment parameter based on the timing advance command and the difference between the target timing advance and the timing advance.

3. The method of claim 1, wherein adjusting the adjustment parameter based on the timing advance command and at least one of: a difference between the target timing advance and the timing advance; and the adjustment of the timing advance comprises adjusting the adjustment parameter based on the timing advance command and the adjustment of the timing advance.

4. The method of claim 1, further comprising adjusting the timing advance by the calculated adjustment if the calculated adjustment exceeds a threshold.

5. The method of claim 1, further comprising adjusting the target timing advance by a product of a determined relative downlink timing change and a multiplier value.

6. The method of claim 1, wherein the adjustment parameter comprises the adjustment step size.

7. The method of claim 1, wherein calculating an adjustment of a timing advance comprises calculating the adjustment as a function of a determined relative downlink timing change and the difference between the target timing advance and the timing advance, the adjustment being limited by the adjustment step size.

8. The method of claim 1, wherein calculating an adjustment of a timing advance comprises calculating the adjustment as a function of the difference between the target timing advance and the timing advance, the adjustment being limited by the adjustment step size.

9. The method of claim 1, wherein the adjustment parameter comprises the adjustment time interval, and
the method further comprises performing adjustments of the timing advance at times separated by the adjustment time interval.

10. The method of claim 1, further comprising, upon receipt of the timing advance command, adjusting the timing advance by a value indicated in the timing advance command, and
setting the target timing advance to be equal to the thus adjusted timing advance.

11. The method of claim 2, wherein adjusting the adjustment parameter based on the timing advance command and the difference between the target timing advance and the timing advance comprises:
if the target timing advance and the timing advance are within a specified margin, leaving the adjustment parameter unchanged.

12. The method of claim 2, wherein adjusting the adjustment parameter based on the timing advance command and the difference between the target timing advance and the timing advance comprises:
comparing the difference between the target timing advance and the timing advance with a value indicated in the timing advance command and altering the adjustment parameter based on said comparison.

13. The method of claim 12, wherein the adjustment parameter comprises the adjustment step size and wherein altering the adjustment parameter based on said comparison comprises:
increasing the adjustment step size if the numeric sign of the difference between the target timing advance and the timing advance and the numeric sign of the value indicated in the timing advance command are equal; and
decreasing the adjustment step size if the numeric sign of the difference between the target timing advance and the timing advance and the numeric sign of the value indicated in the timing advance command are different.

14. The method of claim 12, wherein the adjustment parameter comprises the adjustment time interval and wherein altering the adjustment parameter based on said comparison comprises:
decreasing the adjustment time interval if the numeric sign of the difference between the target timing advance and the timing advance and the numeric sign of the value indicated in the timing advance command are equal; and
increasing the adjustment time interval if the numeric sign of the difference between the target timing advance and the timing advance and the numeric sign of the value indicated in the timing advance command are different.

15. The method of claim 3, wherein adjusting the adjustment parameter based on the timing advance command and the adjustment of the timing advance comprises:
comparing the adjustment of the timing advance with a value indicated in the timing advance command and altering the adjustment parameter based on said comparison.

16. The method of claim 15, wherein the adjustment parameter comprises the adjustment step size and wherein altering the adjustment parameter based on said comparison comprises:
increasing the adjustment step size if the numeric sign of the adjustment of the timing advance and the numeric sign of the value indicated in the timing advance command are equal; and
decreasing the adjustment step size if the numeric sign of the adjustment of the timing advance and the numeric sign of the value indicated in the timing advance command are different.

17. The method of claim 15, wherein the adjustment parameter comprises the adjustment time interval and wherein altering the adjustment parameter based on said comparison comprises:
decreasing the adjustment time interval if the numeric sign of the adjustment of the timing advance and the numeric sign of the value indicated in the timing advance command are equal; and
increasing the adjustment time interval if the numeric sign of the adjustment of the timing advance and the numeric sign of the value indicated in the timing advance command are different.

18. The method of claim 1, wherein the adjustment parameter is limited by at least one of a maximum adjustment parameter value and a minimum adjustment parameter value.

19. A mobile device comprising:
a processor;
a downlink timing monitor configured for determining a relative downlink timing change; and
a timing advance adjustor configured for:
calculating an adjustment of a timing advance toward a target timing advance in accordance with an adjustment parameter, the adjustment parameter comprising at least one of an adjustment step size and an adjustment time interval,
the target timing advance being a function of the relative downlink timing change,
the timing advance indicating uplink transmission timing relative to downlink reception timing; and
upon receipt of a timing advance command, adjusting the adjustment parameter based on the timing advance command and at least one of:
the difference between the target timing advance and the timing advance; and
the adjustment of the timing advance.

20. A non-transitory computer readable medium having computer executable instructions stored thereon which, when executed by a computer, cause the computer to implement a method in a mobile device, the method comprising:
- calculating an adjustment of a timing advance toward a target timing advance in accordance with an adjustment parameter, the adjustment parameter comprising at least one of an adjustment step size and an adjustment time interval,
- the target timing advance being a function of a relative downlink timing change,
- the timing advance indicating uplink transmission timing relative to downlink reception timing; and
- upon receipt of a timing advance command, adjusting the adjustment parameter based on the timing advance command and at least one of:
- a difference between the target timing advance and the timing advance; and
- the adjustment of the timing advance.

* * * * *